(12) United States Patent
Kobayashi

(10) Patent No.: US 7,302,578 B2
(45) Date of Patent: Nov. 27, 2007

(54) INFORMATION PROCESSING APPARATUS, IMAGE FORMING APPARATUS, PROGRAM-INITIATION ERROR PROCESSING METHOD, AND RECORDING MEDIUM

(75) Inventor: Ayako Kobayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 794 days.

(21) Appl. No.: 10/800,646

(22) Filed: Mar. 16, 2004

(65) Prior Publication Data
US 2005/0005204 A1    Jan. 6, 2005

(30) Foreign Application Priority Data
Mar. 19, 2003   (JP)   ............................. 2003-076603
Mar. 4, 2004    (JP)   ............................. 2004-060621

(51) Int. Cl.
*G06F 9/00*   (2006.01)

(52) U.S. Cl. ...................... 713/182; 713/176; 713/161; 713/193; 713/180; 380/229; 380/230; 380/232; 380/234

(58) Field of Classification Search ................ 713/182, 713/176, 161, 193, 180; 380/229, 230, 232, 380/234
See application file for complete search history.

(56) References Cited

FOREIGN PATENT DOCUMENTS

JP   2002-84383   3/2002

*Primary Examiner*—Thomas R. Peeso
(74) *Attorney, Agent, or Firm*—Oblon, Spivak, McClelland, Maier & Neustadt, P.C.

(57) ABSTRACT

An information processing apparatus has a detection unit to detect a recording medium and initiates a program read from the recording medium detected by the detection unit. In the information processing apparatus, an operation check unit performs an operation check of the recording medium detected by the detection unit. An authentication check unit performs an authentication check of the recording medium detected by the detection unit. An error notification unit notifies an operator of an error of the recording medium if at least one of a result of the operation check and a result of the authentication check is an error.

23 Claims, 25 Drawing Sheets

FIG.5
33
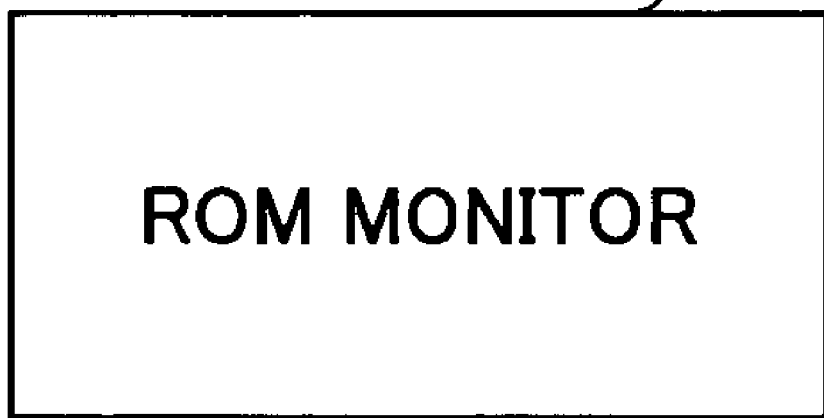
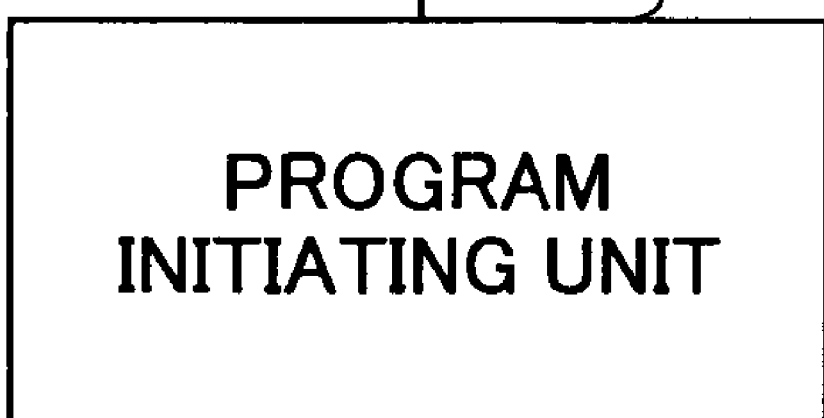

init.d/
printer.cnf
printer.lic module/
printer.mod
printer.mac

```
mount. gzromfs module/printer.mod /mnt/printer
exec /mnt/printer/printer
```

FIG.16

[LIST OF DEVICE STATE]

| FUNCTION | STATE | |
|---|---|---|
| COPIER | OK | |
| PRINTER | NG | SD CARD AUTH. ERROR |
| FACSIMILE | NG | SD CARD MEDIA ERROR |
| SCANNER | OK | |

FIG.21

©KINDS OF ERROR

| | | |
|---|---|---|
| CPU_ERROR | 1 | # CPU ERROR |
| MEMORY_ERROR | 2 | # MEMORY ERROR |
| NVRAM_ERROR | 3 | # NVRAM ERROR |
| HDD_ERROR | 4 | # HDD ERROR |
| ROM_ERROR | 5 | # ROM ERROR |
| ENGINE_ERROR | 6 | # ENGINE ERROR |
| FCU_ERROR | 7 | # FCU BOARD ERROR |
| SD_LICENSE_MOVED | 8 | # SD CARD ERROR (LICENSE MOVED) |
| SD_LICENSE_ERROR | 9 | # SD CARD ERROR (AUTH. ERROR) |
| SD_MEDIA_ERROR | 10 | # SD CARD ERROR (MEDIA ERROR) |
| NETWORK_ERROR | 11 | # NETWORK CONNECTION ERROR |
| PRINTER_ERROR | 12 | # PRINTER FUNCTION ERROR |
| FONT_ERROR | 13 | # FONT FUNCTION ERROR |
| NETFILE_ERROR | 14 | # NETWORK FILE FUNCTION ERROR |
| NO_TONER | 15 | # NO TONER |
| NO_PAPER | 16 | # NO PAPER |
| NO_CONFIG_FILE | 17 | # NO CONFIG. FILE |
| ADDRESS_BOOK_ERROR | 18 | # ADDRESS BOOK ERROR |
| SEND_MAIL_ERROR | 19 | # SEND-MAIL ERROR |
| RECEIVE_MAIL_ERROR | 20 | # RECEIVE-MAIL ERROR |

ATTENTION !
~ ERROR REPORT ~

ERROR: SD CARD AUTH. ERROR (SC9)
FILE NAME: /mnt/sd1/module/printer.mod
SD CARD SLOT NO.: 1
DEVICE STATE: CAN BE CONTINUED
RETURN CONDITION: DETACH THE DEFECTIVE SD CARD AND INSERT THE CORRECT SD CARD

PHONE NO: 123-4567

FIG.26

ATTENTION !
~ ERROR REPORT ~

ERROR: NVRAM DATA ACCESS ERROR (SC3)
PROGRAM: FAX PROGRAM
DEVICE STATE: CANNOT BE CONTINUED

PLEASE CONTACT THE FOLLOWING OFFICE
PHONE NO.: 123-4567

INFORMATION PROCESSING APPARATUS, IMAGE FORMING APPARATUS, PROGRAM-INITIATION ERROR PROCESSING METHOD, AND RECORDING MEDIUM

BACKGROUND OF THE INVENTION

1. Field of the Invention

The present invention generally relates to an information processing apparatus, an image forming apparatus, a program-initiation error processing method and a recording medium, and more specifically to a program-initiation error processing method for performing an error processing when initiating a program read from a recording medium, and to an information processing apparatus, an image forming apparatus and a recording medium, which use the program-initiation error processing method.

2. Description of the Related Art

An information processing apparatus, such as a personal computer, carries out various kinds of information processing by performing one or more programs corresponding to respective information processing procedures.

Moreover, an image forming apparatus (for example, a multi-function peripheral system), which is an application example of the information processing apparatus, is provided with the display unit, the printing unit, the image pickup unit, etc., which are accommodated in a single housing, in addition to the four kinds of programs corresponding to the printer, the copier, the facsimile, and the scanner, respectively. By selecting one of the programs, the multi-function peripheral system is operated as the selected one of the printer, the copier, the facsimile, and the scanner.

Japanese Laid-Open Patent Application No. 2002-084383 discloses an example of the multi-function peripheral system mentioned above.

Upon power-up of the multi-function peripheral system or the like, the BIOS (basic input/output system) and the boot loader are started. The boot loader expands the kernel and the root file system on the RAM (random access memory), and initiates the kernel. The kernel mounts the root file system. The "mounting" herein means that a file system, a peripheral device, etc. are started so that the file system or peripheral device can be accessed by another system or device.

After the startup of the kernel, the bootstrap which starts an application program (which is called the application) is started. The bootstrap is a process which is first started by the information processing apparatus or the multi-function peripheral system.

The bootstrap mounts the file system according to a predetermined configuration file. The bootstrap starts the program, which is required for operation of the information processing apparatus or the multi-function peripheral system and recorded in a program-initiation recording medium, such as a hard disk drive (HDD), according to the predetermined configuration file.

In recent years, there is an increasing demand for a system that can easily initiate a program of the information processing apparatus or the multi-function peripheral system from the program-initiation recording medium, such as a SD (secure digital) card.

The addition of a new program to the above-mentioned program-initiation recording medium may be carried out through the network, such as the Internet or a LAN. Moreover, the addition of a new program to the program-initiation recording medium may be carried out by using an SD card which is a detachable recording medium the insertion and removal of which is possible.

The user can make use of the program which is added to the program-initiation recording medium, in any information processing apparatus or multi-function peripheral system. Hence, there is a possibility that the program may be illegally added to a program-initiation recording medium which is provided in the information processing apparatus or the multi-function peripheral system which is not authorized to add the program thereto.

Moreover, when a program is added to a program-initiation recording medium using a detachable program-addition recording medium, such as an SD card, the insertion and removal of which is possible, the program recorded in the program-addition recording medium can be also used with any information processing apparatus or multi-function peripheral system. There is also a possibility that the program may be illegally added to a program-initiation recording medium which is provided in the information processing apparatus or the multi-function peripheral system which is not authorized to add the program thereto.

Therefore, when adding the program to the program-initiation recording medium of the information processing apparatus or the multi-function peripheral system, the provision of a mechanism for preventing the program added to the program-initiation recording medium from being illegally used is demanded, in order to establish the security of the program.

SUMMARY OF THE INVENTION

An object of the present invention is to provide an improved program-initiation error processing method in which the above-described problems are eliminated.

Another object of the present invention is to provide a program-initiation error processing method which allows initiation of a program on an information processing apparatus or image forming apparatus by using a program-initiation recording medium, such as a SD card, and establishes the security of the program recorded in the program-initiation recording medium.

Another object of the present invention is to provide an information processing apparatus which allows initiation of a program on the information processing apparatus by using a program-initiation recording medium, such as a SD card, and establishes the security of the program recorded in the program-initiation recording medium.

Another object of the present invention is to provide an image forming apparatus which allows initiation of a program on the image forming apparatus by using a program-initiation recording medium, such as a SD card, and establishes the security of the program recorded in the program-initiation recording medium.

Another object of the present invention is to provide a computer-readable recording medium which allows initiation of a program on an information processing apparatus or image forming apparatus by using a program-initiation recording medium, such as a SD card, and establishes the security of the program recorded in the program-initiation recording medium.

The above-mentioned objects of the present invention are achieved by an information processing apparatus which has a detection unit to detect a recording medium and initiates a program read from the recording medium detected by the detection unit, the information processing apparatus comprising: an operation check unit performing an operation check of the recording medium detected by the detection unit; an authentication check unit performing an authentication check of the recording medium detected by the detection unit; and an error notification unit notifying an operator of an error of the recording medium if at least one of a result of the operation check and a result of the authentication check is an error.

The above-mentioned objects of the present invention are achieved by an image forming apparatus which has a detection unit to detect a recording medium and initiates an image-formation-related program read from the recording medium detected by the detection unit, the image forming apparatus comprising: an operation check unit performing an operation check of the recording medium detected by the detection unit; an authentication check unit performing an authentication check of the recording medium detected by the detection unit; and an error notification unit notifying an operator of an error of the recording medium if at least one of a result of the operation check and a result of the authentication check is an error, wherein the image forming apparatus reads the program from the recording medium and initiates the read program if both the result of the operation check and the result of the authentication check are normal.

The above-mentioned objects of the present invention are achieved by an error processing method for use in an information processing apparatus which has a detection unit to detect a recording medium and initiates an image-formation-related program read from the recording medium detected by the detection unit, the error processing method comprising: performing an operation check of the recording medium detected by the detection unit; performing an authentication check of the recording medium detected by the detection unit; and notifying an operator of an error of the recording medium if at least one of a result of the operation check and a result of the authentication check is an error.

The above-mentioned objects of the present invention are achieved by a computer-readable recording medium storing a program embodied therein for causing a computer to perform: detecting a recording medium; performing an operation check of the detected recording medium; performing an authentication check of the detected recording medium; and notifying an operator of an error of the detected recording medium if at least one of a result of the operation check and a result of the authentication check is an error.

According to the present invention, when at least one of the operation check and the authentication check of a SD card indicates an error, the operator is notified of the occurrence of that error. If the result of the authentication check is an error, it is determined that the program of the SD card is illegally copied or altered, and a predetermined error processing is performed. The initiation of such altered program on the information processing apparatus or the image forming apparatus using the program-initiation recording medium can be prevented. The initiation of the correct program on the information processing apparatus or the image forming apparatus is allowed by using the program-initiation recording medium, such as a SD card. Therefore, it is possible to establish the security of the program recorded in the program-initiation recording medium.

BRIEF DESCRIPTION OF THE DRAWINGS

Other objects, features and advantages of the present invention will be apparent from the following detailed description when reading in conjunction with the accompanying drawings.

FIG. 5 is a block diagram of an embodiment of a MFP booting unit in the multi-function peripheral system of FIG. 3.

FIG. 16 is a diagram of an example of the error screen.

FIG. 21 is a diagram of an example of the error classification which is received by the error-processing program.

FIG. 24 is a diagram of an example of the error report in the processing of FIG. 23.

FIG. 26 is a diagram of an example of the error report in the error processing of FIG. 25.

DETAILED DESCRIPTION OF PREFERRED EMBODIMENTS

A description will now be given of the preferred embodiments of the invention with reference to the accompanying drawings.

Figure 1:
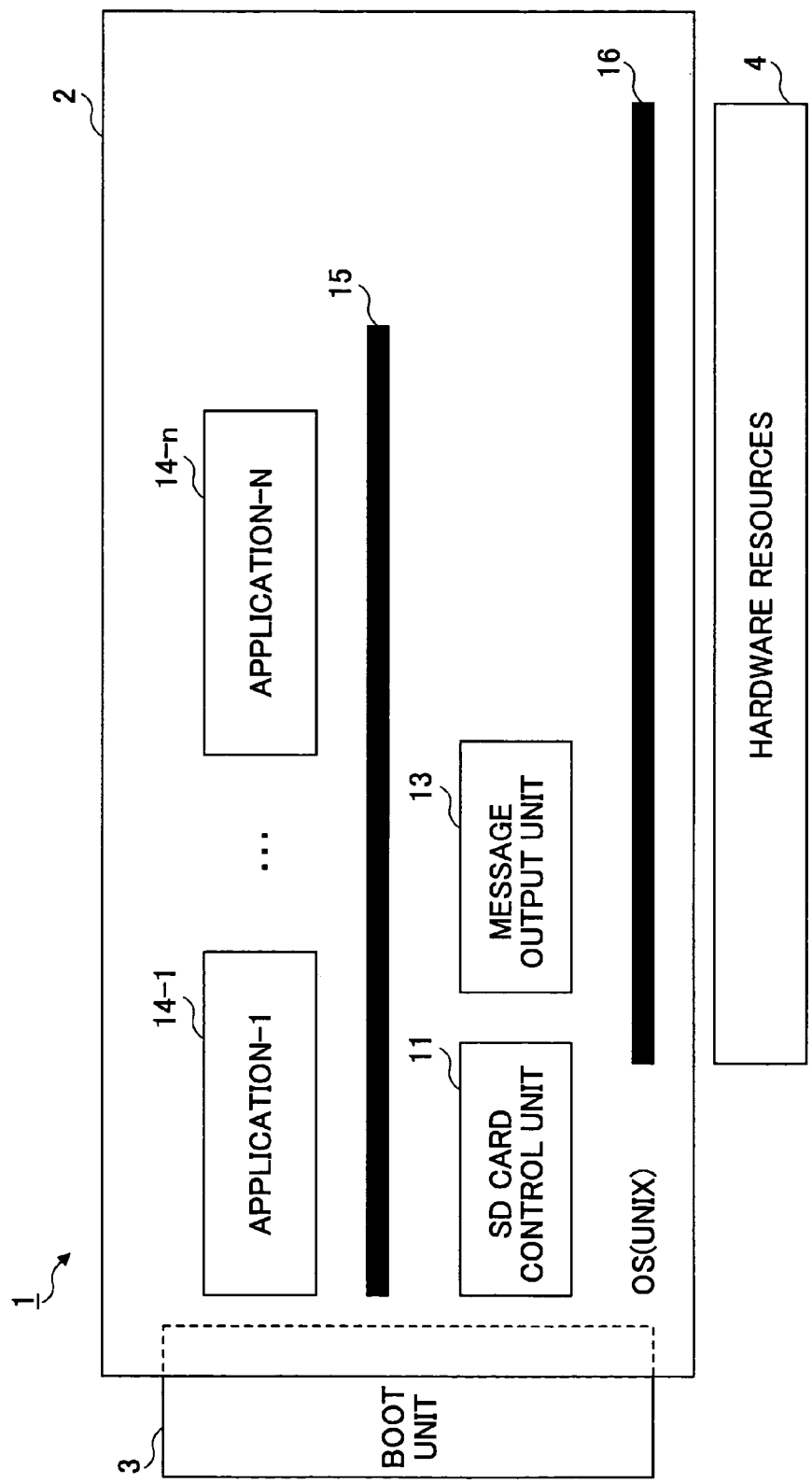
FIG. 1 is a block diagram of an embodiment of the information processing apparatus of the invention.

FIG. 1 is a block diagram of an embodiment of the information processing apparatus of the present invention.

The information processing apparatus 1 is constituted so that the software group 2, the boot unit 3, and the hardware resources 4 may be included.

The boot unit 3 is first activated upon power-up of the information processing apparatus 1, and starts the program initiating unit which is described later.

The program initiating unit starts the software group 2 of the information processing apparatus 1.

Moreover, the program initiating unit reads the programs of the SD card control unit 11, the message output unit 13, the applications 14-1 to 14-n from the auxiliary memory device or the SD card, etc., and transmits each program to the memory device so that it starts the program. Hereinafter, the applications mean the application programs which are executed on the OS (operating system), and such programs or the application programs may also be called the applications.

The hardware resources 4 comprise the hardware resources, including the input device, the display device, the auxiliary memory device, the memory device, the interface device, and the SD-card slot.

Moreover, the software group 2 includes the programs of the SD card control unit 11, the message output unit 13, and the applications 14-1 to 14 -n, which are started on the OS, such as UNIX (registered trademark).

The OS carries out parallel execution of the programs (or the applications) of the SD card control unit 11, the message output unit 13 and the applications 14-1 to 14-n, as the processes on the OS.

The API (application program interface) 15 is used for the pre-defined function to receive the request from the applications 14-1 to 14-n. The engine I/F 16 is used for the pre-defined function to transmit the request to the hardware resources 4.

In addition, the SD card control unit 11, the message output unit 13, and the program initiating unit will be described later.

Next, a description will be given of a hardware composition of the information processing apparatus 1 of FIG. 1.

Figure 2:
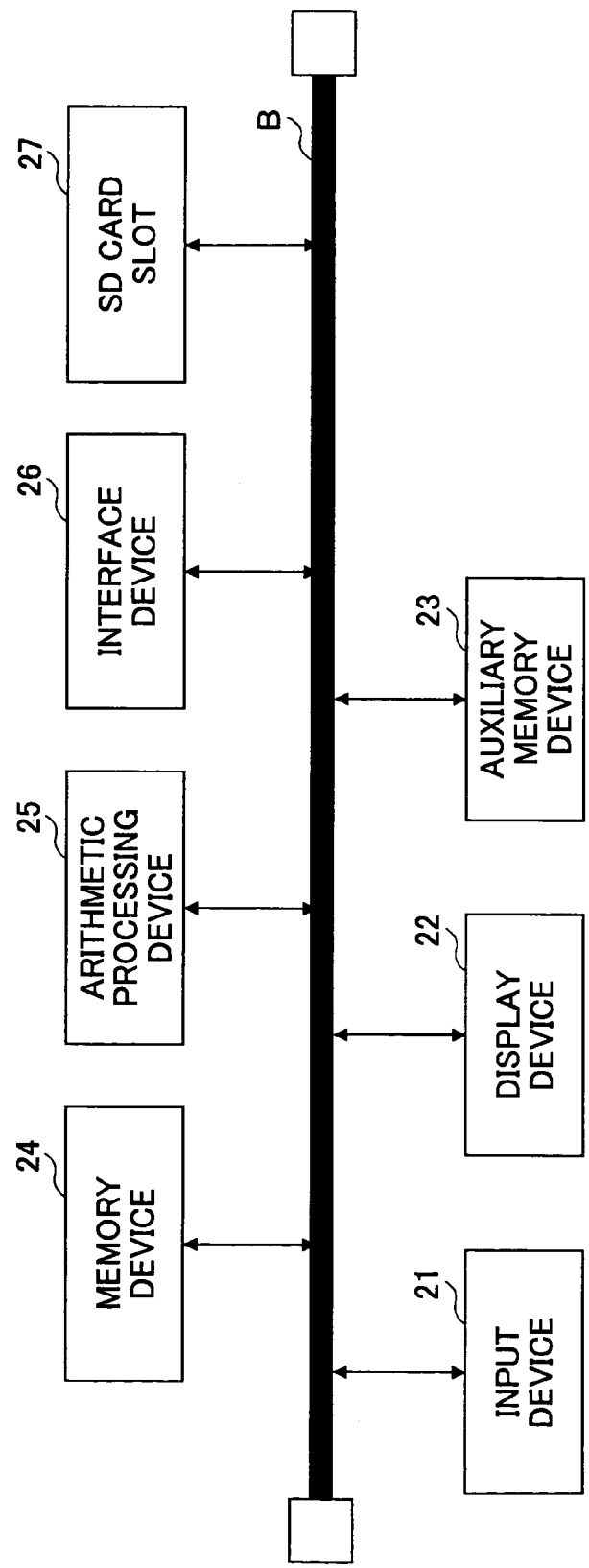
FIG. 2 is a block diagram of a hardware composition of the information processing apparatus of FIG. 1.

FIG. 2 shows a hardware composition of the information processing apparatus 1 of the present invention.

The information processing apparatus 1 of FIG. 2 is constituted so that the input device 21, the display device 22, the auxiliary memory device 23, the memory device 24, the arithmetic processing device 25, the interface device 26, and the SD card slot 27, which are interconnected by the bus B, may be included.

The input device 21 includes the keyboard, the mouse, etc., and it is used by the operator to input various operational instructions. The display device 22 displays various operational data and windows which are required for the operations.

The interface device 26 provides the interfaces for connecting the information processing apparatus 1 to the network or the computer terminal, and includes the modem, the router, or the devices according to various interface specifications.

The insertion and removal of the SD card is possible with respect to the SD card slot 27. The SD card slot 27 transmits an interrupt signal, which is generated in response to the insertion or removal of the SD card, to the SD card access driver (which will be described later).

The auxiliary memory device 23 stores various files, data, etc. The SD card inserted in the SD card slot 27 and the auxiliary memory device 23 store the programs of the SD card control unit 11, the message output unit 13, the applications 14-1 to 14-n, which are related to the processing of the information processing apparatus 1, and store various files, data, etc. required for the program processing.

The memory device 24 stores the programs, which are read from the SD card control unit 11, the message output unit 13, and the applications 14-1 to 14-n, from the SD card inserted in the SD card slot 27, and the auxiliary memory device 23, etc. at the time of starting of the information processing apparatus 1.

The arithmetic processing unit 25 performs arithmetic processing according to the programs of the SD card control unit 11, the message output unit 13 and the applications 14-1 to 14-n, which are stored in the memory device 24.

Next, a description will be given of the composition of the multi-function-peripheral system 31 as an application example of the information processing apparatus 1 of the invention.

The following description will be focused on the composition of the multi-function peripheral system 31. However, the same is applicable to the composition of the information processing apparatus 1 of the invention.

The image forming apparatus in the present embodiment is provided with the respective functions of image forming modules, such as the printer, the copier, the facsimile, and the scanner, which are contained in one housing of the apparatus, and the image forming apparatus will be called the multi-function peripheral system (MFP).

The multi-function peripheral system (MFP) includes the display unit, the printing unit, the image reading unit, etc. in a single housing, and is provided with the four kinds of software (application programs) corresponding to the printer, the copier, the facsimile, and the scanner, respectively. By selecting one of these applications, and the MFP is operated as the selected one of the printer, the copier, the facsimile, and the scanner.

Figure 3:
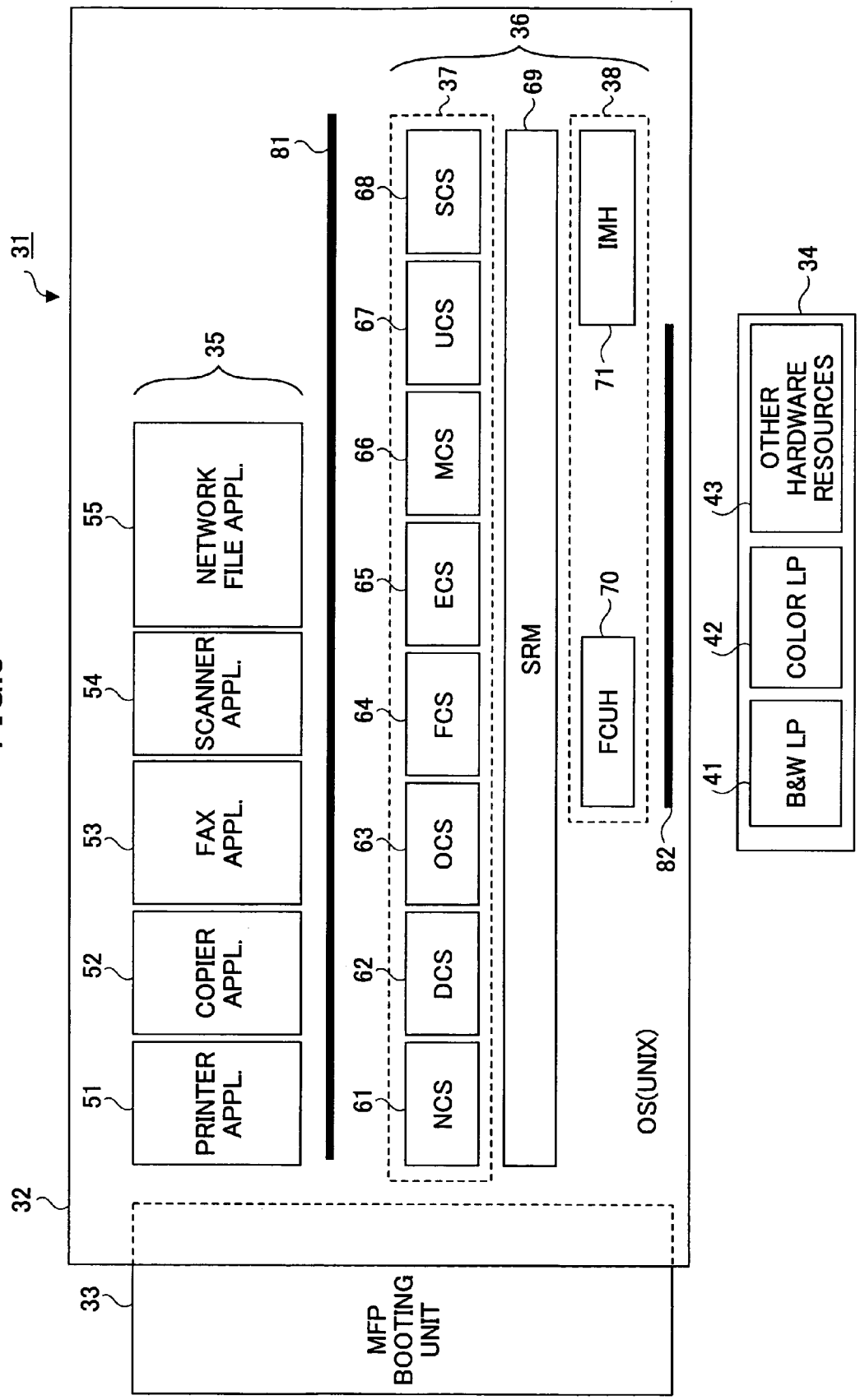
FIG. 3 is a block diagram of an embodiment of the multi-function peripheral system of the invention.

FIG. 3 is a block diagram of an embodiment of the multi-function peripheral system of the invention.

As shown in FIG. 3, the multi-function peripheral system (MFP) 31 is constituted so that the software group 32, the MFP boot unit 33, and the hardware resources 34 are included.

The MFP boot unit 33 is activated upon power-up of the multi-function peripheral system 31, and starts execution of the application layer 35 and the platform 36 in the software group 32.

For example, the MFP boot unit 33 reads the programs of the application layer 35 and the platform 36 from the hard disk drive (HDD) etc., transfers each read program to the memory storage, and starts the execution thereof.

The hardware resources 34 include the monochrome laser beam printer (B&W LP) 41, the color laser printer (Color LP) 42, and other hardware resources 43, such as the scanner and the facsimile.

The software group 32 includes the application layer 35 and the platform 36 which are operated on the operating system (OS), such as UNIX (registered trademark).

The application layer 35 includes the programs which perform processing specific to the respective user services related to the image formation, such as the printer, the copier, the facsimile, and the scanner. Specifically, the application layer 35 includes the printer application 51, the copier application 52, the fax application 53, the scanner application 54, and the network file application 55.

The platform 36 includes the control service layer 37, the system resource manager (SRM) 69, and the handler layer 38. The control service layer 37 interprets the processing request from the application layer 35, and generates the acquisition request to the hardware resources 34. The SRM 69 manages one or more hardware resources 34, and arbitrates the acquisition request from the control service layer 37. The handler layer 38 manages the hardware resources 34 according to the acquisition request from SRM 69.

The control service layer 37 is constituted to include one or more service modules therein. Specifically, the control service layer 37 includes the network control service (NCS) 61, the delivery control service (DCS) 62, the operation panel control service (OCS) 63, the facsimile control service (FCS) 64, the engine control service (ECS) 65, the memory control service (MCS) 66, the user information control service (UCS) 67, and the system control service (SCS) 68.

In addition, the platform 36 is constituted with the pre-defined functions so that the application program interface (API) 81 which receives a processing request from the application layer 35 is included. The operating system (OS) carries out parallel execution of the applications of the application layer 35 and the platform 36 as processes thereon.

The process of NCS 61 acts as the agent that distributes the data received from the network through the corresponding protocol over the applications, and transmits the data from the applications to the network through the corresponding protocol. For example, the process of NCS 61 controls data communications of HTTP (hypertext transfer protocol) between the MFP and the clients connected via the network, by using HTTPD (hypertext transfer protocol daemon).

The process of DCS 62 controls delivery of the accumulated documents etc. The process of OCS 63 controls operation of the operation panel. The process of FCS 64 provides the application program interface for performing the facsimile transmission and reception using the PSTN or ISDN network from the application layer 35, the registration/retrieval of various facsimile data managed with the backup memory, the facsimile reading, the facsimile reception and printing, etc.

The process of ECS 65 controls the engine units, such as the monochrome laser beam printer 41, the color laser printer 42, and the other hardware resources 43. The process of MCS 66 performs memory control of the memory acquisition and releasing, the use of HDD, the compression and expansion of image data, etc. The process of UCS 67 manages user information. The process of SCS 68 controls the application management, the operation panel control, the system monitor displaying, the LED monitor displaying, the hardware-resources management, the interrupted application control, etc.

The process of SRM 69 carries out the system control and the management of the hardware resources 34 associated with SCS 68. For example, the process of SRM 69 arbitrates the acquisition requests from the upper layer to use the hardware resources 34, such as the monochrome laser beam printer 31 and the color laser printer 32, and controls the execution thereof.

Specifically, the process of SRM 69 determines whether the hardware resources 34 can be used according to the acquisition request (or whether they are currently used according to another acquisition request). When the use of the hardware resources 34 is possible, the process of SRM 69 notifies the upper layer that the hardware resources 34 can be used according to the acquisition request.

Moreover, the process of SRM 69 performs scheduling of the use of the hardware resources 34 according to the acquisition request from the upper layer, and carries out the contents of the request (for example, the paper conveyance and the imaging operation by means of the printer engine, the memory reservation, the file generation, etc.) directly.

Moreover, the handler layer 38 includes the facsimile control unit handler (FCUH) 70 which manages the facsimile control unit (FCU), and the image memory handler (IMH) 71 which carries out the memory assignment of the process and the management of the memory assigned to the process.

SRM 69, FCUH 70, and IMH 71 perform the processing request to the hardware resources 34 by using the engine interface 82 which transmits the processing request to the hardware resources 34 with the pre-defined functions.

With the above-described composition of FIG. 3, the multi-function peripheral system 31 can carry out the intensive control of each processing commonly required by the respective applications on the platform 36.

Figure 4:
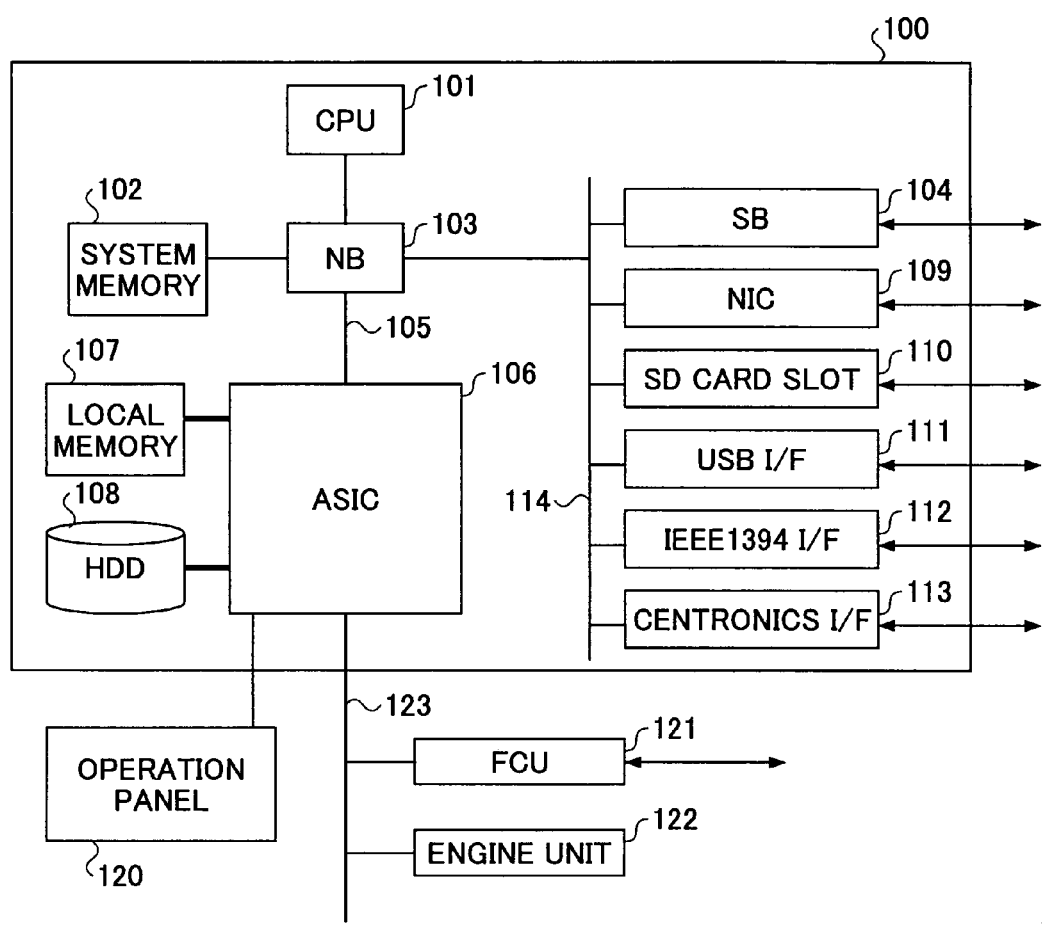
FIG. 4 is a block diagram of a hardware composition of the multi-function peripheral system of FIG. 3.

Next, a description will be given of the hardware configuration of the multi-function peripheral system 31 of the invention. FIG. 4 shows the hardware configuration of the multi-function peripheral system 31 of FIG. 3.

As shown in FIG. 4, the multi-function peripheral system 31 includes the controller 100, the operation panel 120, the facsimile control unit (FCU) 121, and the engine unit 122.

The controller 100 includes the CPU 101, the system memory 102, the north bridge (NB) 103, the south bridge (SB) 104, the application-specific integrated circuit (ASIC) 106, the local memory (LM) 107, the hard disk drive (HDD) 108, the network interface controller (NIC) 109, the SD card slot 110, the USB device 111, the IEEE1394 device 112, and the Centronics interface 113.

CPU 101 performs the control of the whole multi-function peripheral system 31. CPU 101 starts execution of NCS 61, DCS 62, OCS 63, FCS 64, ECS 65, MCS 66, UCS 67, SCS 68, SRM 69, FCUH 70, and IMH 71, and performs each process of the programs on the OS. Moreover, CPU 101 starts execution of the printer application 51, the copier application 52, the facsimile application 53, the scanner application 54, and the network file application, which constitute the application layer 35, and performs each process of the programs on the OS.

NB 103 is the bridge which is provided for interconnection of CPU 101, the system memory 102, SB 104, and ASIC 106. The system memory 102 is the memory which is used for image drawing of the multi-function peripheral system 31. SB 104 is the bridge which is provided for interconnection of NB 103, ROM (not shown), the PCI bus 114, and the peripheral devices.

The local memory 107 is the memory which is used as the image buffer for copying documents or the buffer for encoding images. ASIC 106 is the application-specific integrated circuit for image processing uses including the hardware for image processing. HDD 108 is the storage device for accumulating images, document data, programs, font data, forms, etc. The operation panel 120 is provided to display the operational messages to the operator and receive the input operational commands from the operator.

NIC 109 is the interface device for connecting the MFP 31 to the network. The SD card slot 110 is provided to allow the insertion and removable of the SD card, and the SC card slot 110 transmits an interrupt signal, generated in response to the insertion and removable of the SD card, to the SD card control unit. The USB device 111, the IEEE1394 device 112 and the Centronics interface 113 are the interface devices according to the respective interface specifications.

FIG. 5 is a block diagram of an example of the multi-function-peripheral system (MFP) booting unit of FIG. 3.

The MFP booting unit 33 comprises the ROM monitor 130 and the program initiating unit 131. As described above, the MFP booting unit 33 is first activated upon power-up of the multi-function peripheral system 31, and starts execution of the application layer 35 and the platform 36 of the software group 32.

The ROM monitor 130, which functions as the BIOS and the boot loader, is activated upon power-up of the MFP 31, and performs the initialization of the hardware, the diagnosis of the controller 100, the initialization of the software, etc.

The ROM monitor 130 expands the OS and the root file system on the system memory 102, and starts execution of the OS. The OS mounts the root file system.

Moreover, the program initiating unit 131 is called from the OS, and secures the memory areas on the system memory 102 and the LM 107.

The program initiating unit 131 is the process which is first initiated by the multi-function peripheral system 1, and mounts the file system according to a predetermined configuration file. Specifically, according to the predetermined configuration file, the program initiating unit 131 reads the programs of the application layer 35 and the platform 36, required for operation of the MFP 31, from the HDD 108, the SD card, the ROM, etc., and expands each of the read programs to the memory areas which are secured on the system memory 102 and the LM 107, so that and the program initiating unit 131 starts the processes of the application layer 35 and the platform 36.

Next, a description will be given of processing of the program initiating unit 131.

The program initiating unit 131 reads a predetermined master configuration file at the time of starting, and performs mounting of the file system and starting of the processes according to the master configuration file.

Moreover, the program initiating unit 131 performs the mounting processing according to the description of the mounting, if the description of the mounting is included in the read master configuration file.

Furthermore, when the predetermined directory which includes the file of a predetermined extension in the root director of the file system mounted when the predetermined configuration file in the root directory of the mounted file system exists, the program initiating unit 131 reads the predetermined configuration file or the file of the predetermined extension, and performs mounting processing of the file system.

In addition, "gzromfs" is an example of the file system which can be mounted by the program initiating unit 131. This file system "gzromfs" manages the files of the ROMFS format which are "gzip" compression encoded.

Next, a description will be given of the preferred embodiments of the invention in which the processing to initiate a program on the multi-function peripheral system 31 is performed by using a SD card.

The present invention is not limited to the preferred embodiments which will be described below. Any kind of recording medium may be used instead of the SD card. For example, the recording medium, such as the RFID tag, may be used to carry out the processing.

Next, a description will be given of the first preferred embodiment of the present invention.

Figure 6:
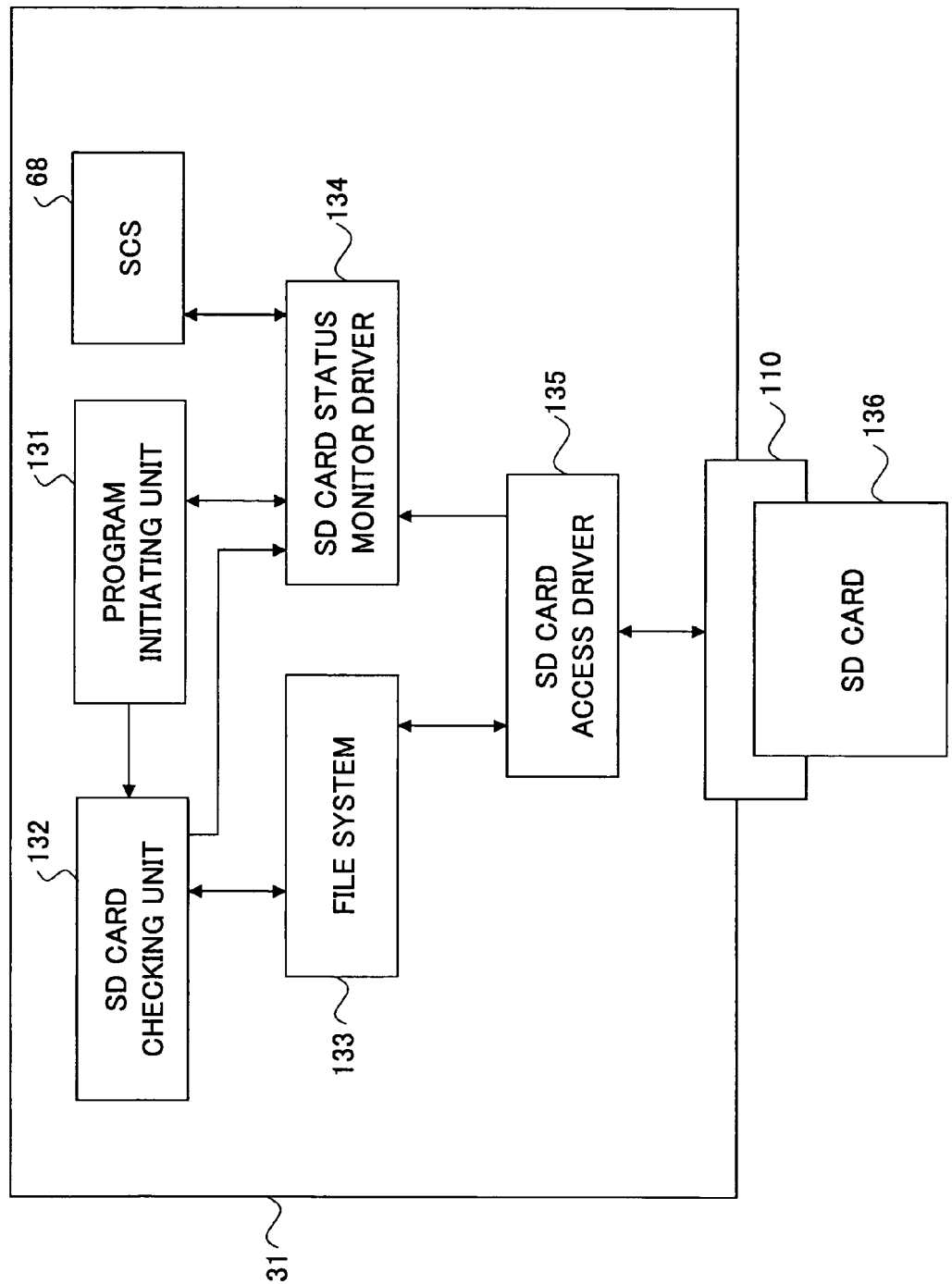
FIG. 6 is a diagram for explaining an example of the processing to initiate a program on the multi-function peripheral system by using a SD card.

FIG. 6 is a diagram for explaining an example of the processing to initiate a program on the multi-function peripheral system by using a SD card.

In FIG. 6, only the composition required for description among the composition of the multi-function peripheral system 31 is illustrated, and the composition which does not need description is omitted therein.

The SD card 136 is a recording medium the insertion and removal of which is possible in a state of the multi-function peripheral system 31 being powered up. The insertion and removal of the SD card 136 is possible with the SD card slot 110, and when the insertion or removal of the SD card 136 takes place, an interrupt signal is sent from the SD card slot 110 to the SD card access driver 135.

The SD card access driver 135 performs the access control to the SD card 136. In response to the interrupt signal received from the SD card slot 110, the SD card access driver 135 notifies the insertion or removal of the SD card 136 to the SD card status monitor driver 134. The SD card status monitor driver 134 manages the status information of the SD card 136, such as removal, insertion, mounting, unmounting of the SD card 136. The SD card status monitor driver 134 notifies the status information of the SD card 136 to the program initiating unit 131.

The program initiating unit 131 initiates the SD card check unit 132 in response to the insertion or removal of the SD card 136.

Moreover, the program initiating unit 131 initiates the program in the SD card 136 according to the status information of the SD card 136 received from the SD card status monitor driver 134. Moreover, the SD card check unit 132 is provided to perform the operation check of the SD card 136, and it is set to the state which can be used as the file system 133.

The SD card check unit 132 is provided with the operation check function of the SD card 136, the mounting function, the unmounting function, the notice function of the state information, etc. The operation check of the SD card 136 may include the compatibility check, the access check, etc.

For example, the compatibility check is performed to determine whether the SD card media is correct with respect to the partition of the SD card 136 or the file system.

The compatibility check includes the signature word check of the boot sector, the check of the sector size of the boot block, the check of the cluster size, the check of the file system information (the identifier, the version, the size), the check of the FAT file system, initialization of the directory section, the check of the directories, etc. In addition, when the recording medium error occurs, the restoration of the medium may be performed automatically.

Moreover, the access check is performed to determine whether a predetermined data can be read immediately after a certain fixed magic number is written to the recording medium.

Next, a description will be given the procedure which initiates a program on the multi-function peripheral system 31 by using the SD card 136.

The program initiating unit 131 is set in an idle state in which it waits for an event, after the processes of the platform 36 and the application layer 35 of the multi-function peripheral system 31 are started.

For example, if the SD card 136 is inserted in the SD card slot 110, the SD card access driver 135 notifies the insertion of the SD card 136 to the SD card status monitor driver 134 according to the interrupt signal received from the SD card slot 110. The SD card status monitor driver 134 notifies the insertion of the SD card 136 to the program initiating unit 131.

Figure 7:
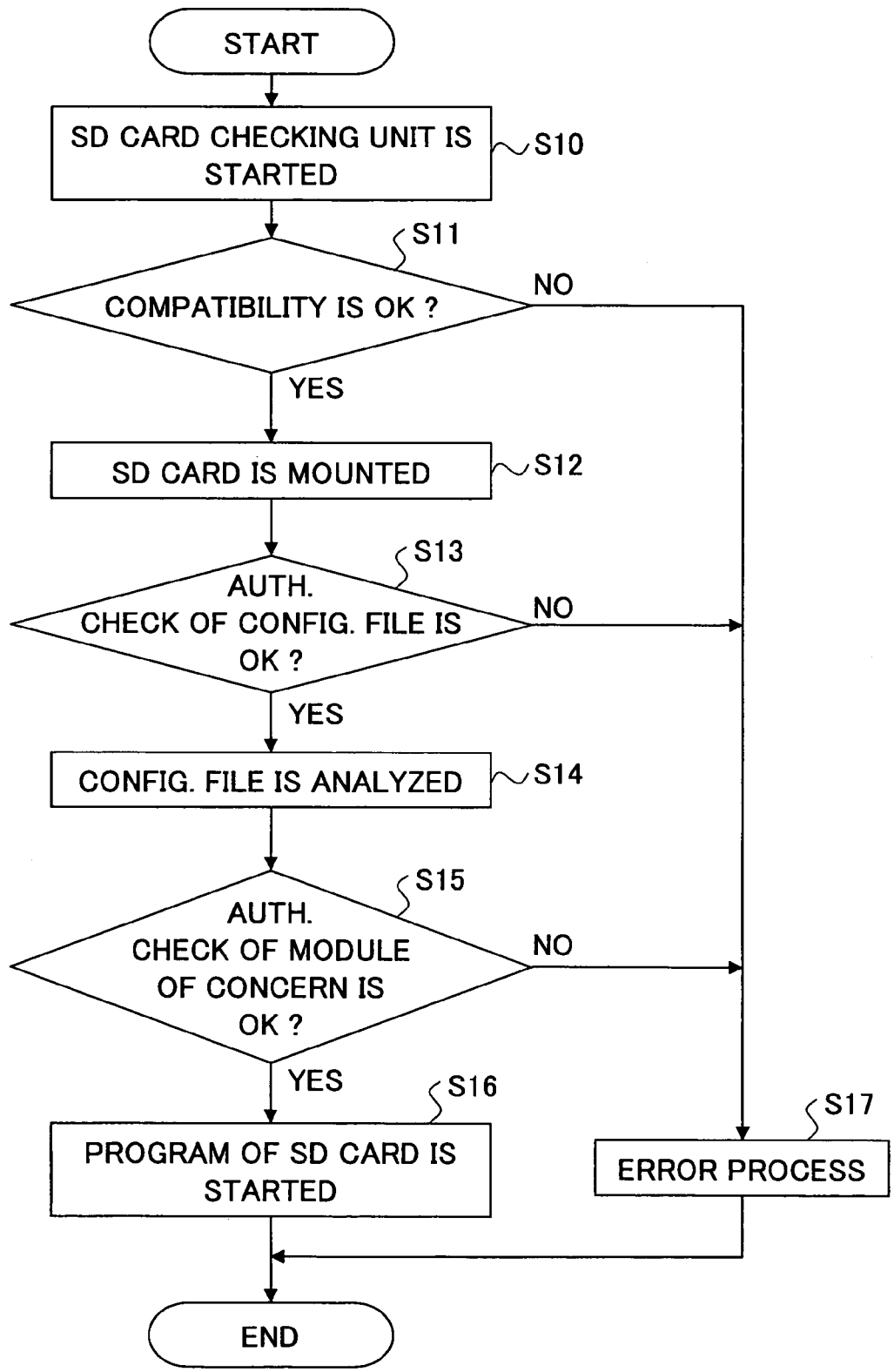
FIG. 7 is a flowchart for explaining an example of the processing to detect the insertion of a SD card in the multi-function peripheral system.

When the insertion of the SD card 136 is notified by the SD card status monitor driver 134, the program initiating unit 131 performs the processing of FIG. 7 since it is determined that there is the occurrence of an event.

FIG. 7 is a flowchart for explaining an example of the SD card insertion detection processing.

At step S10, the program initiating unit 131 starts the SD card check unit 132.

Progressing to step S11, the SD card check unit 132 performs the compatibility check of the SD card 136 as an example of the operation check of the SD card 136.

When the compatibility check is O.K. as a result at step S11, progressing to step S12, the SD card check unit 132 mounts the SD card 136.

And the SD card check unit 132 notifies the result of the compatibility check of the SD card 136 and the mounting of the SD card 136, to the SD card status monitor driver 134. After this, the processing is suspended.

On the other hand, when the compatibility check is not O.K. as a result at step S11, the SD card check unit 132 notifies the result (N.G., or no good) of the compatibility check of the SD card 136 and the unmounting of the SD card 136, to the SD card status monitor driver 134. After this, progressing to step S17, the SD card check unit 132 performs the error processing which will be described later.

When the mounting of the SD card 136 is notified from the SD card status monitor driver 134 to the program initiating unit 131, the control of the program initiating unit 131 is progressed to step S13. When it is determined at step S13 that there is the configuration file in the mounted SD card 136, the program initiating unit 131 at step S14 performs the authentication check of the configuration file by using the authentication check library.

When it is determined at step S13 that there is no configuration file in the mounted SD card 136, the control of the program initiating unit 131 is returned to the event waiting state.

Figure 8:
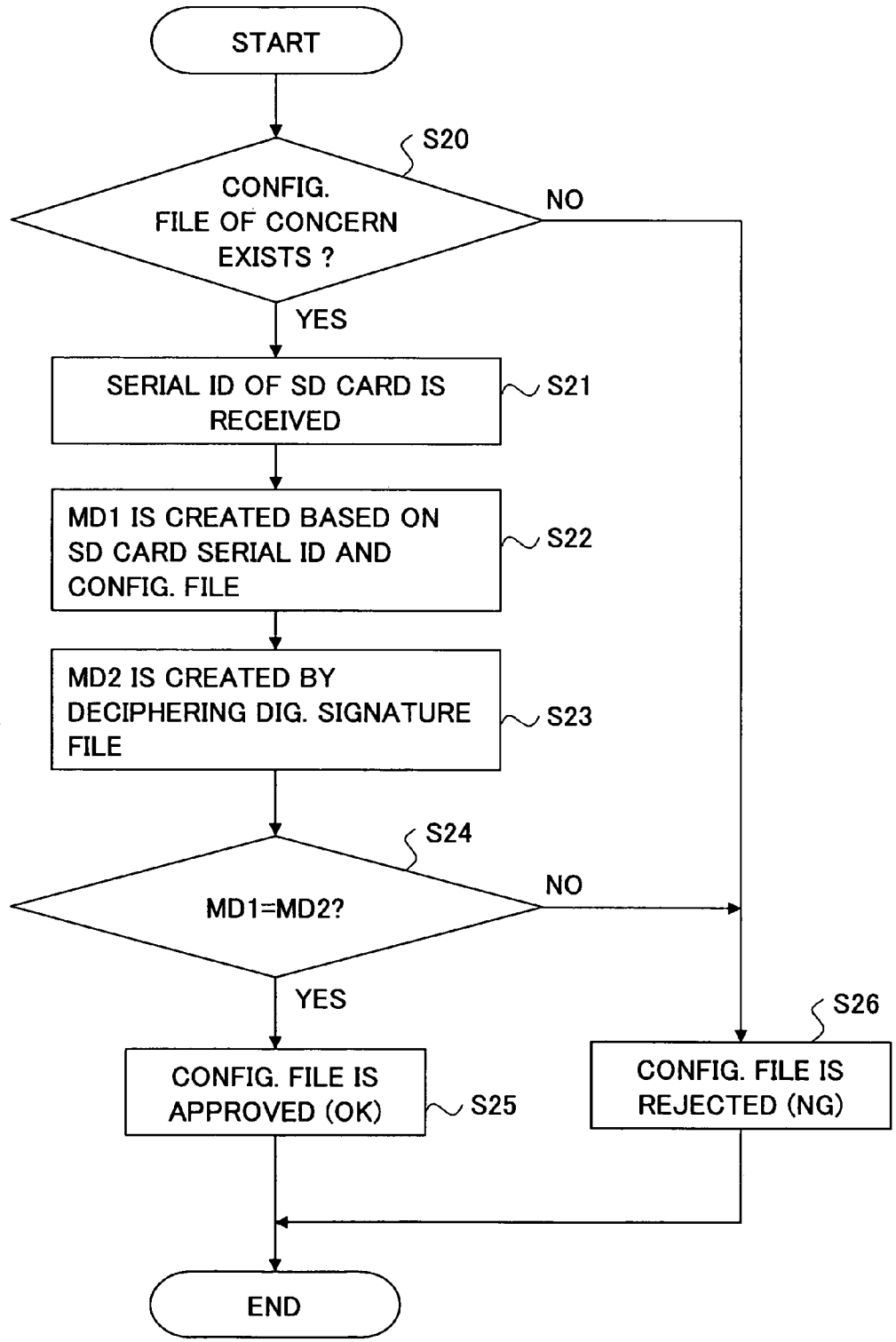
FIG. 8 is a flowchart for explaining an example of the processing of the authentication check of a configuration file.

For example, the authentication check of the configuration file is performed as in the processing of FIG. 8.

FIG. 8 is a flowchart for explaining an example of the processing of the authentication check of the configuration file.

At step S20, the program initiating unit 131 determines whether the files of concern which are used for the authentication check of the configuration file are included in the SD card 136. The files used for the authentication check of the configuration file include the configuration file, and the electronic signature file created based on the configuration file and the message digest (MD) of the serial ID of the SD card.

Figures 9, 10:
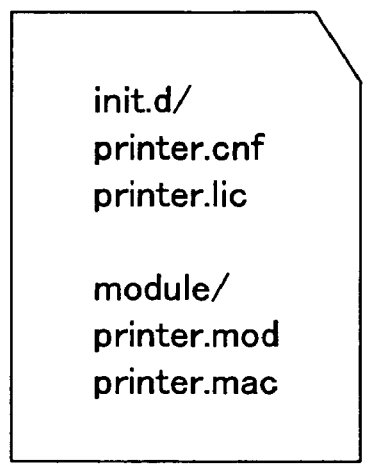
FIG. 9 is a diagram of an example of the files recorded in the SD card.
FIG. 10 is a diagram of an example of the configuration file.

FIG. 9 shows an example of the files of concern recorded in the SD card.

In the example of FIG. 9, "printer.cnf" indicates the configuration file, "printer.lic" indicates the electronic signature file used for the authentication check of the configuration file, "printer.mod" indicates the module file for being mounted, and "printer.mac" indicates the electronic signature file used for the authentication check of the module file for being mounted.

When it is determined at step S20 that the files of concern used for the authentication check of the configuration file are included, the program initiating unit 131 will progress to step S21, after acquiring the configuration file and the electronic signature file used for the authentication check of the configuration file from the SD card 136.

At step S21, the program initiating unit 131 acquires the serial ID of the SD card 136 from the SD card 136.

Progressing to step S22, the program initiating unit 131 creates the first message digest (MD1) based on the configuration file acquired at step S20 and the serial ID of the SD card 136 acquired at step S21.

Progressing to step S23, the program initiating unit 131 decodes the electronic signature file acquired at step S20 with the public key, and creates the second message digest (MD2) based on the result of the decoding.

Progressing to step S24, the program initiating unit 131 determines whether the MD1 created at step S22 and the MD2 created at step S23 are equal to each other.

When it is determined at step S24 that the MD1 created at step S22 and the MD2 created at step S23 are equal, the program initiating unit 131 will progress to step S25, and determines that the result of the authentication check of the configuration file is O.K.

On the other hand, when it is determined at step S24 that the MD1 created at step S22 and the MD2 created at step S23 are not equal, the program initiating unit 131 will progress to step S26, and determines that the result of the authentication check of the configuration file is N.G.

When the MD1 created at step S22 and the MD2 created at step S23 are not equal, it is determined that there is a high possibility that the files currently recorded in the SD card 136 are illegally copied or altered.

In addition, when it is determined at step S20 that the files of concern used for the authentication check of the configuration file are not included, the program initiating unit 131 will also progress to step S26, and determines that the result of the authentication check of the configuration file is N.G.

Referring back to step S13 of FIG. 7, when it is determined at step S13 that the result of the authentication check of the configuration file is O.K., the program initiating unit 131 will progress to step S14, and performs the analysis of the configuration file as shown in FIG. 10.

After the step S14 is performed, the program initiating unit 131 notifies to the SD card status monitor driver 134 that the result of the authentication check of the configuration file is O.K.

When it is determined at step S13 that the result of the authentication check of the configuration file is N.G., the program initiating unit 131 will progress to step S17 and performs the error processing which is described later, after notifying to the SD card status monitor driver 134 that the result of the authentication check of the configuration file is N.G.

FIG. 10 shows an example of the configuration file. In the example of FIG. 10, it is illustrated that the configuration file is the file "module/printer.mod" of the ROMFS format which is created by the gzip compression is mounted at the mounting location "/mnt/printer", and the processing is performed by executing the mounted module file.

Progressing to step S15 following step S14, when the description of the mounting is included in the configuration file, the program initiating unit 131 performs the authentication check of the filed of concern for being mounted by using the authentication check library.

Figure 11:
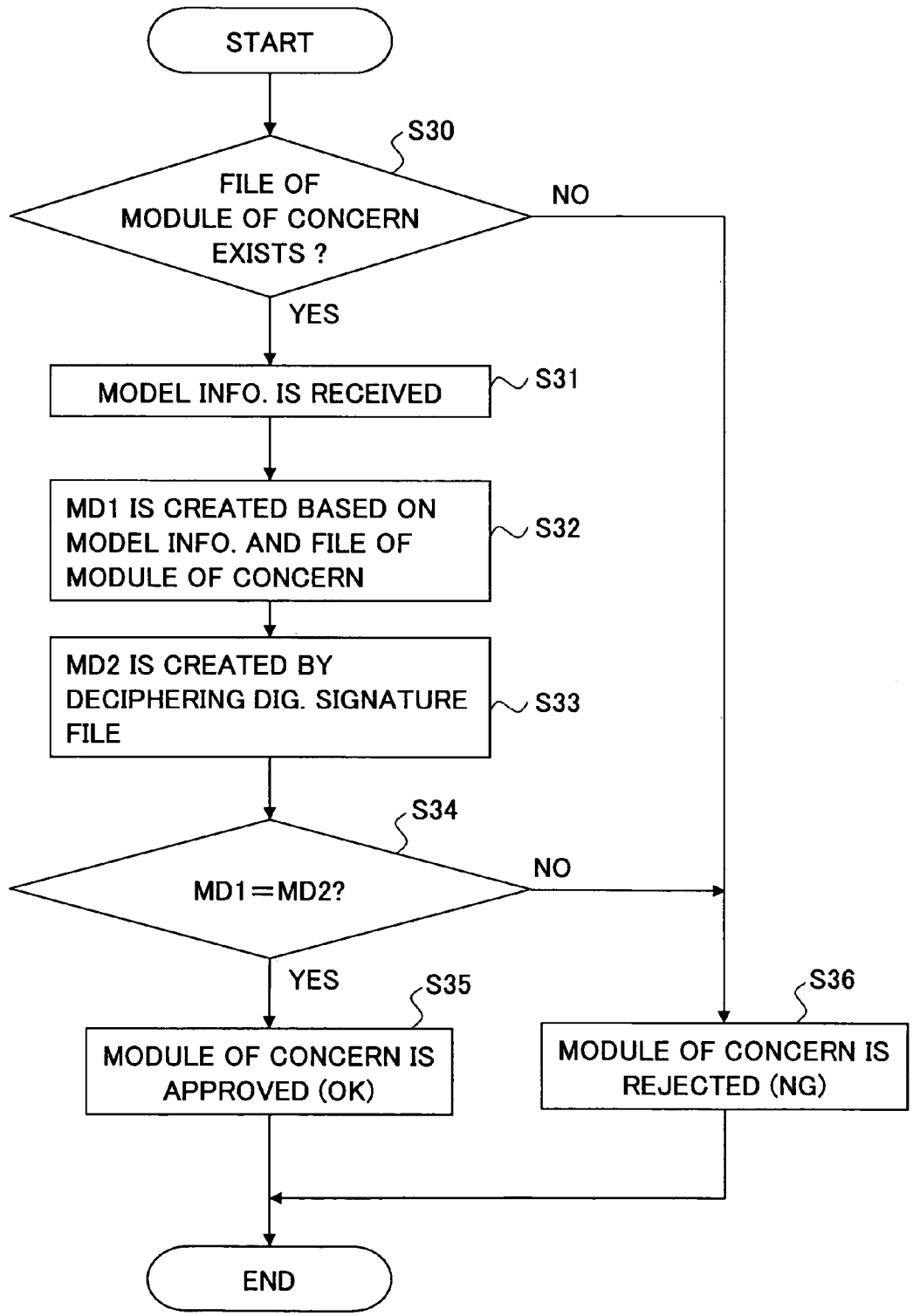
FIG. 11 is a flowchart for explaining an example of the processing of the module of concern for mounting.

For example, the authentication check of the files of concern is performed as in the flowchart of FIG. 11. FIG. 11 is a flowchart for explaining an example of the processing of the authentication check of the module of concern for mounting.

At step S30, the program initiating unit 131 determines whether the files of concern used for the authentication check of the module for mounting are included in the SD card 136. The files of concern used for the authentication check of the module for mounting include the module file for mounting, and the electronic signature file created based on the module file and the MD of the model information specific to the multi-function peripheral system 31.

When it is determined at step S30 that the files of concern used for the authentication check of the module for mounting are included, the program initiating unit 131 acquires the module file for mounting and the electronic signature file used for the authentication check of the module file for mounting, from the SD card 136. After this, the program initiating unit 131 will progress to step S31.

At step S31, the program initiating unit 131 acquires the model information specific to the multi-function peripheral system 31.

Progressing to step S32, the program initiating unit 131 creates the first message digest (MD1) based on the module file acquired at step S30 and the model information specific to the multi-function peripheral system 31 acquired at step S31.

Progressing to step S33, the program initiating unit 131 decodes the electronic signature file acquired at step S30 with the public key, and creates the second message digest (MD2).

Progressing to step S34, the program initiating unit 131 determines whether the MD1 created at step S32 and the MD2 created at step S33 are equal to each other.

When it is determined at step S34 that the MD1 created at step S32 and the MD2 created at step S33 are equal, the program initiating unit 131 will progress to step S35, and determines that the result of the authentication check of the module for mounting is O.K.

On the other hand, when it is determined at step S34 that the MD1 created at step S32 and the MD2 created at step S33 are not equal, the program initiating unit 131 will progress to step S36, and determines that the result of the authentication check of the module for mounting is N.G.

When the MD1 created, at step S32 and the MD2 created at step S33 are not equal, it is determined that there is a high possibility that the files currently recorded in the SD card 136 are illegally copied or altered.

When it is determined at step S30 that the files of concern used for the authentication check of the module for mounting are not included, the program initiating unit 131 will progress to step S36, and determines that the result of the authentication check of the module for mounting is N.G.

Referring back to step S15 of FIG. 7, when the result of the authentication check of the module for mounting is O.K., the program initiating unit 131 will progress to step S16, and performs the mounting of the module of concern and executes the mounted module. The program initiating unit 131 notifies to the SD card status monitor driver 134 that the result of the authentication check of the module for mounting is O.K.

When it is determined at step S15 that the result of the authentication check of the module for mounting is N.G., the program initiating unit 131 progresses to step S17 and performs the error processing, which is described later, after notifying to the SD card status monitor driver 134 that the result of the authentication check of the module for mounting is N.G.

Figure 12:
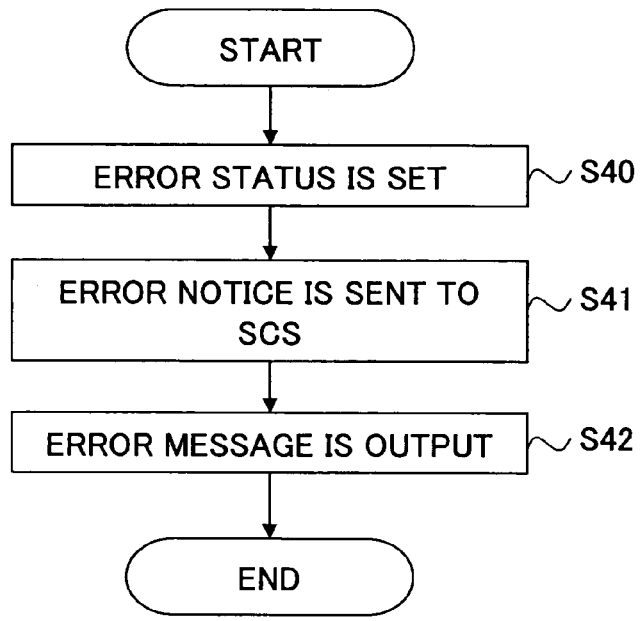
FIG. 12 is a flowchart for explaining an example of the error processing.

Next, a description will be given of the error processing of the step S17 in the processing of FIG. 7. FIG. 12 is a flowchart for explaining an example of the error processing.

At step S40, the SD card status monitor driver 134 sets the error status (for example, the compatibility check error, the authentication error, etc.) of the SD card 136, which is received from the program initiating unit 131, the number of the SD card slot 110 of the defective SD card 136 where the error takes place, and the path of the files with which the error of the authentication check takes place.

Progressing to step S41, the SD card status monitor driver 134 sends the notice of the error to the SCS 68.

When the notice of the error from the SD card status monitor driver 134 is received, progressing to step S42, the SCS 68 performs the error output processing which is described later.

Figure 13:
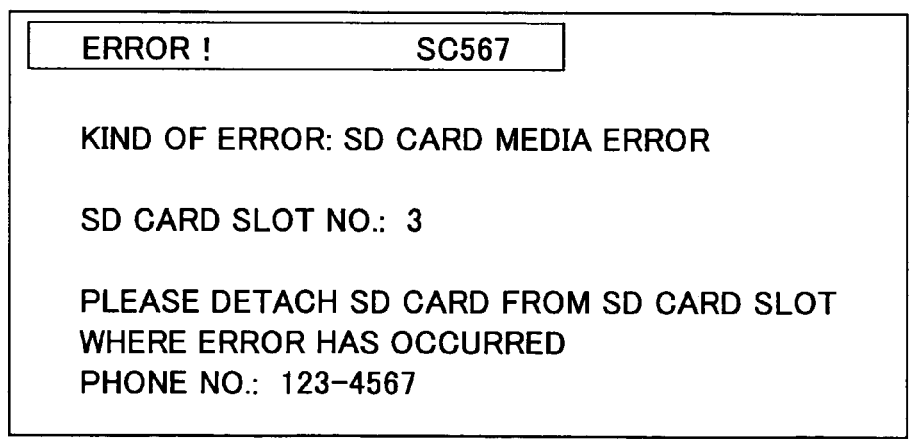
FIG. 13 is a diagram of an example of the error message screen displayed on the operation panel when a SD card media error occurs.
Figure 14:
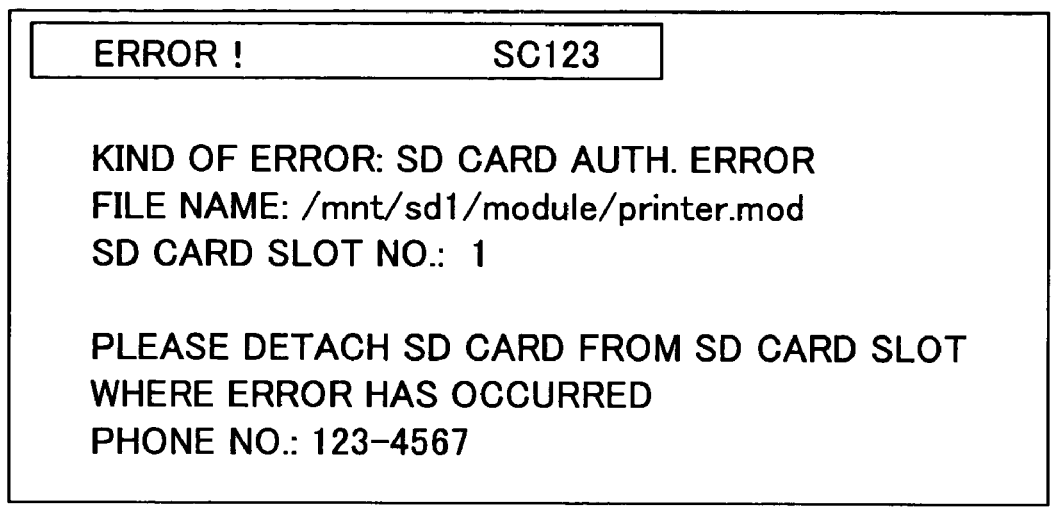
FIG. 14 is a diagram of an example of the error message screen displayed on the operational panel when a SD card authentication error occurs.

For example, the SCS 68 displays the error screen of FIG. 13 or FIG. 14 on the control panel 120 of the MFP 31, and notifies the occurrence of the error to the operator on the MFP 31.

FIG. 13 shows an example of the error screen which is displayed on the control panel 120 when the compatibility check error occurs. Moreover, FIG. 14 shows an example of the error screen which is displayed on the control panel 120 when the authentication check error occurs.

When the compatibility check error occurs, none of the programs (module) currently recorded in the SD card 136 can be started. Moreover, when the authentication check error occurs, a part of the programs currently recorded in the SD card 136 cannot be started. The path of the files with which the authentication check error takes place is displayed as in the error screen of FIG. 14.

Figure 15:
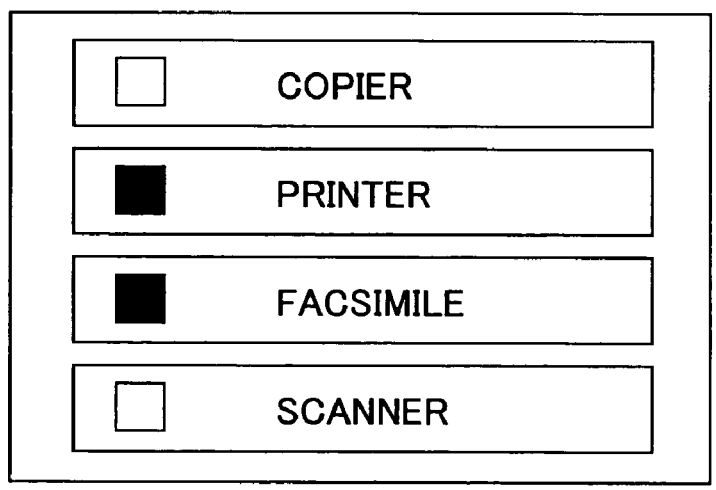
FIG. 15 is a diagram of an example of the function buttons indicating the usability of each function.

In addition, the multi-function peripheral system 31 may be provided with the function buttons which are controlled to notify the usability of each of the multiple functions to the operator in a visually distinguishable manner such that the lighting of the buttons of the currently usable functions of the system 31 and the lighting of the buttons of the currently unusable functions of the system 31 are distinguishable from each other, as shown in FIG. 15.

FIG. 15 shows an example of the function buttons indicating the usability of each function of the MFP 31.

In the example of FIG. 15, the LED (light emitting diode) displays of the buttons of the copier function and the scanner function which can be currently used are lightened in blue, and the LED displays of the buttons of the printer function and the facsimile function which cannot be used currently are lightened in red.

In addition, the SCS 68 controls the LED displays of the respective function buttons of the copier function, the scanner function, the printer function, and the facsimile function.

The SCS 68 finishes the displaying of the error screen of FIG. 13 or FIG. 14 when the SD card 136 is removed from the SD card slot 110. Specifically, when the removal of the SD card 136 is notified to the SCS 68 by the SD card status monitor driver 134, the SCS 68 finishes the displaying of the error screen of FIG. 13 or FIG. 14.

Moreover, the SCS 68 can also display the error screen as shown in FIG. 16 on the display device of another information processing apparatus which is connected to the multi-function peripheral system 31 through the network.

Figure 17:
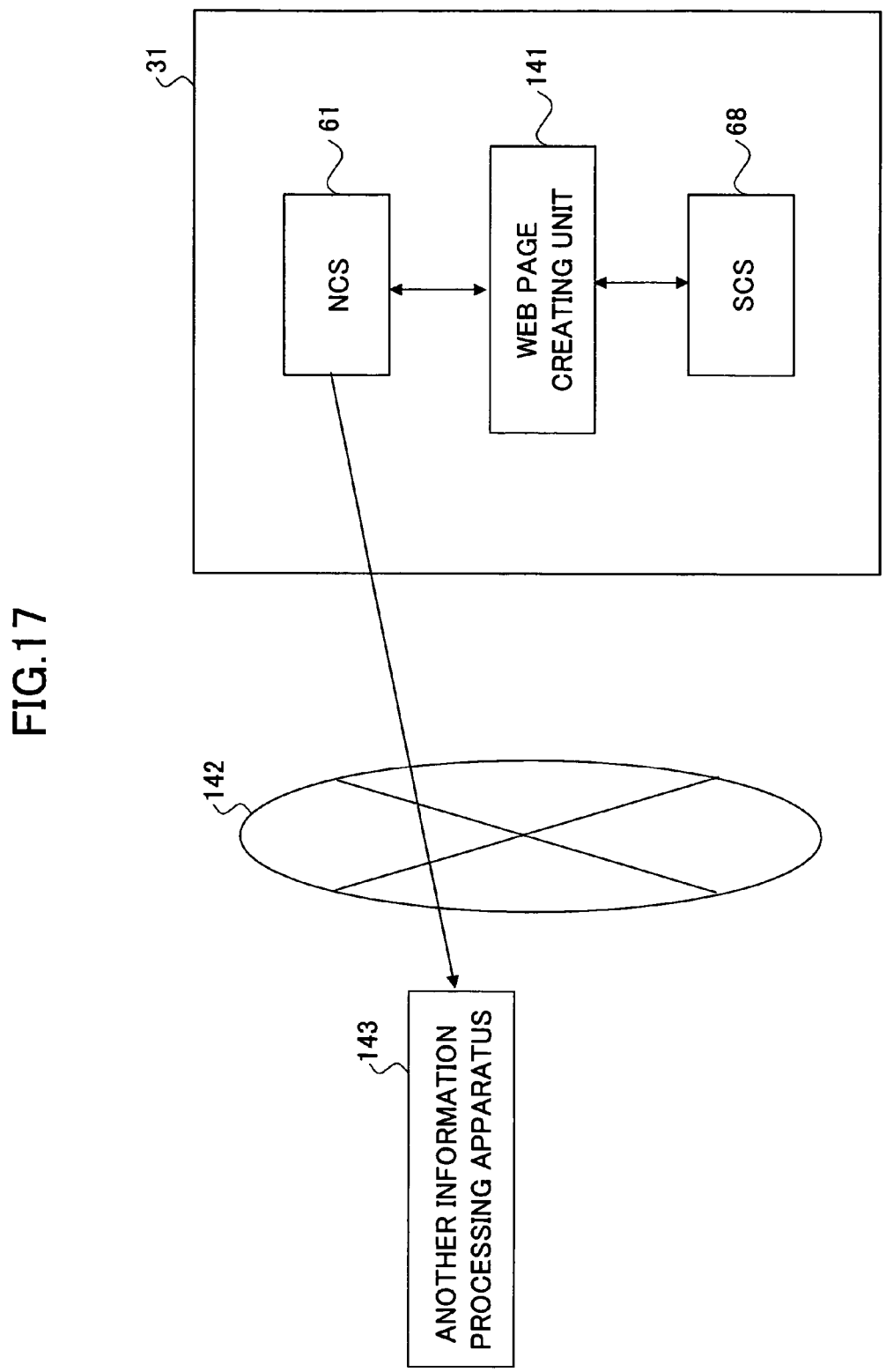
FIG. 17 is a diagram for explaining an example of the processing to display the error screen on another information processing apparatus.

FIG. 16 shows an example of the error screen. The SCS 68 displays the error screen on the display device of the other information processing apparatus by performing the processing as shown in FIG. 17. FIG. 17 shows an example of the processing to display the error screen on the display device of another information processing apparatus.

When the notice of the error from the SD card status monitor driver 134 is received, the SCS 68 supplies the information needed for creating the error screen of FIG. 16, to the WEB page creation unit 141. In addition, the SCS 68 causes the WEB page creation unit 141 to create the error screen of FIG. 16 with the information received from the SCS 68.

For example, the WEB page creation unit 141 of the present embodiment may be provided in the application layer 35 or the control service layer 37 of the multi-function peripheral system 31.

The WEB page creation unit 141 transmits the created error screen to the other information processing apparatus 143 through the NCS 61 and the network 142, so that the error screen is displayed on the display device of the other information processing apparatus 143.

Figure 18:
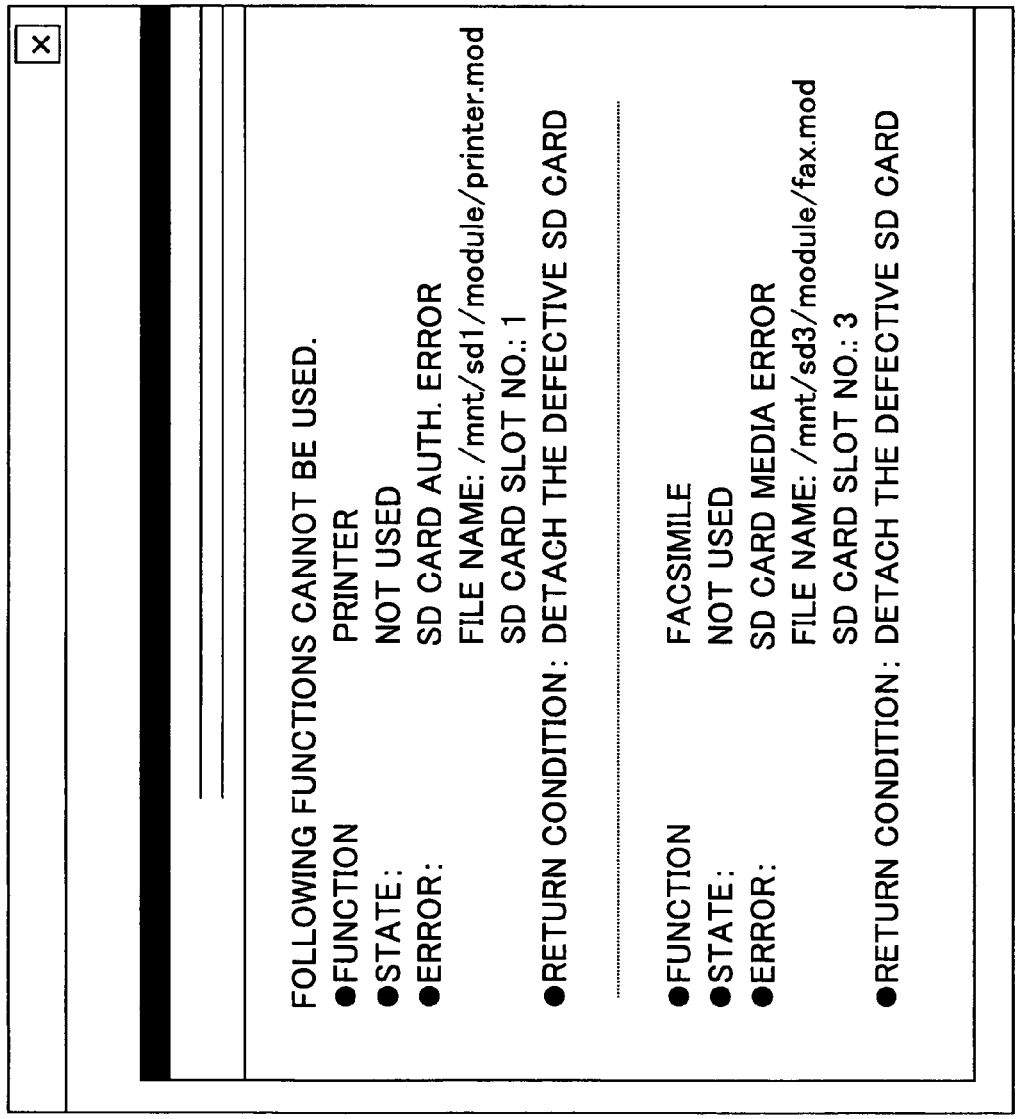
FIG. 18 is a diagram of an example of the e-mail transmitted in order to notify the occurrence of errors in the multi-function peripheral system.

Alternatively, the SCS 68 notifies the occurrence of the error to the operator by transmitting the e-mail as shown in FIG. 18 to another information processing apparatus which is connected to the multi-function peripheral system 31 via the network.

FIG. 18 shows an example of the e-mail for notifying the occurrence of the error. The SCS 68 performs the processing as shown in FIG. 19, so that the e-mail is transmitted to another information processing apparatus which is connected to the MFP 31 via the network.

Figure 19:
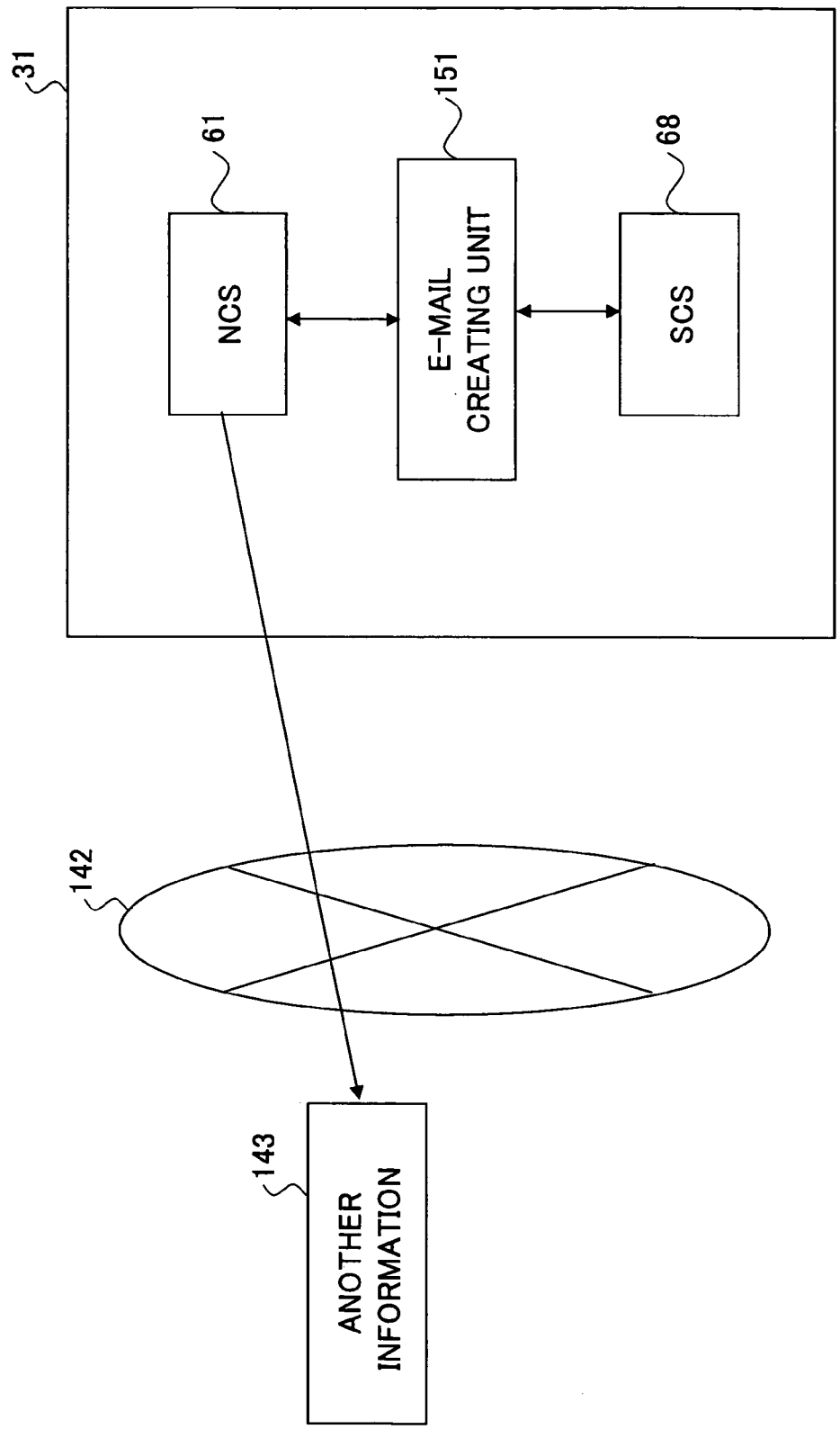
FIG. 19 is a diagram for explaining an example of the processing to transmit the e-mail, notifying the occurrence of errors, to another information processing apparatus.

FIG. 19 shows an example of the processing to transmit the e-mail for notifying the occurrence of the error to another information processing apparatus. When the notice of the error from the SD card status monitor driver 134 is received, the SCS 68 supplies the information needed for creating the e-mail as shown in FIG. 18, to the e-mail creation unit 151. In addition, the SCS 68 causes the e-mail creation unit 151 to create the e-mail of FIG. 18.

For example, the e-mail creation unit 151 of the present embodiment may be provided in the application layer 35 or the control service layer 37 of the multi-function peripheral system 31.

The e-mail creation unit 151 notifies the occurrence of the error to the operator of the other information processing apparatus 143 by transmitting the created e-mail to the other information processing apparatus 143 through the NCS 61 and the network 142.

Next, a description will be given of the second preferred embodiment of the present invention.

In the previously described embodiment, the error of the SD card is dealt with. Alternatively, it is also possible for the present invention to synthetically deal with the error of the hardware or software which is used by the program started by using the SD card.

In the present embodiment, when a certain error occurs due to the factor of the hardware or software in the process of the program started by using the SD card, the notice of the error is sent to the error-processing program, and the error-processing program performs the error processing.

Figure 20:
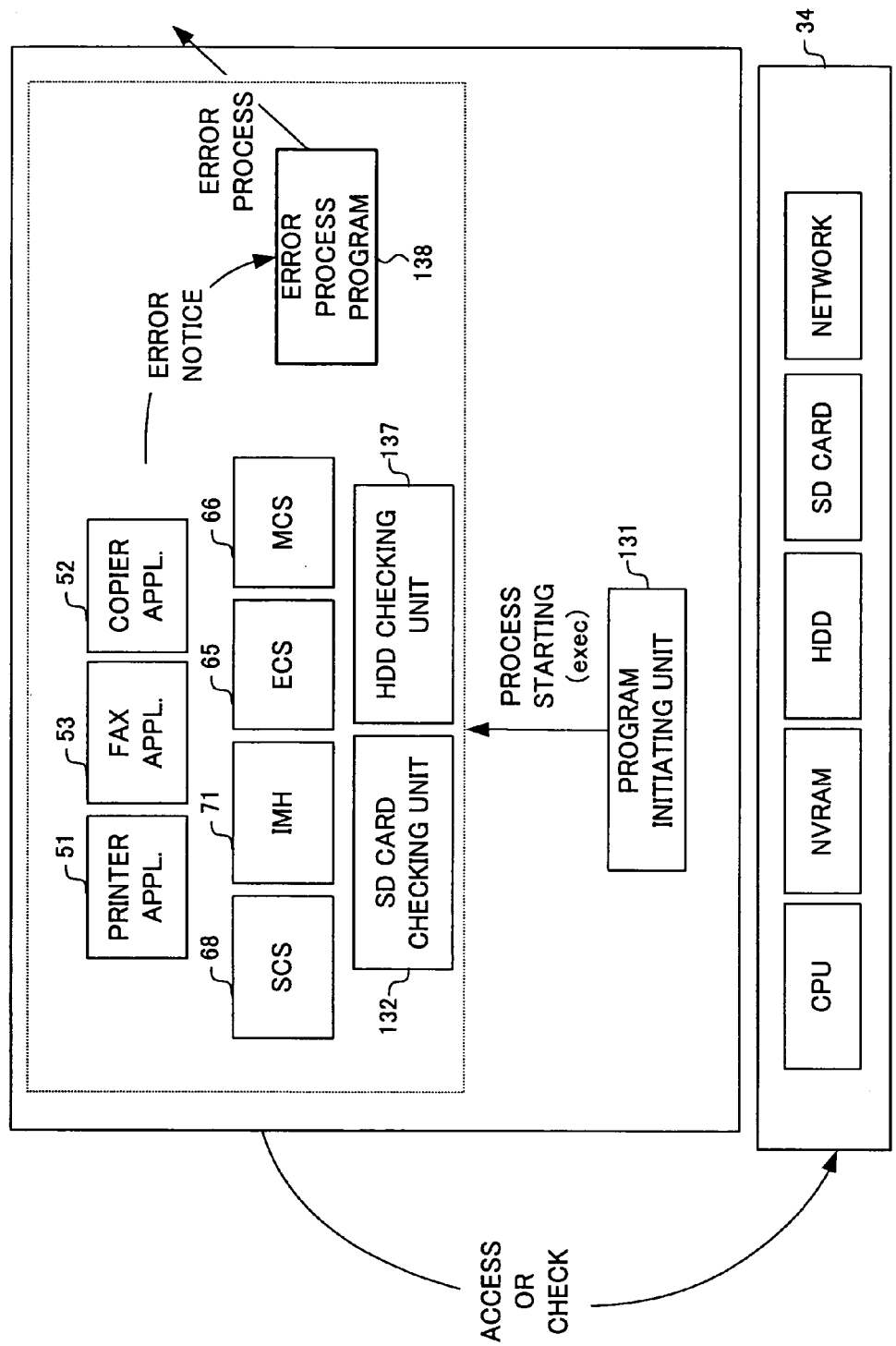
FIG. 20 is a diagram for explaining an example of the error notification and error processing of the invention.

FIG. 20 shows an example of the processing in which the notice of the error is sent and the error processing is performed.

As shown in FIG. 20, the printer application 51, the copier application 52, the fax application 53, the ECS 65, the MCS 66, the SCS 68, the IMH 75, the SD card check unit 132, the HDD checking unit 137, and the error-processing program 138 are started by the program initiating unit 131.

In the following explanation, it is supposed that when referring to the whole process started by the program initiating unit 131, it is only called the process. In FIG. 20, only the composition required for description among the composition of the multi-function peripheral system 31 is illustrated, and the composition which does not need description is omitted therein.

In addition, the error-processing program 138 of the present embodiment may be provided in the application layer 35 or the control service layer 37 of the multi-function peripheral system 31.

The process started by the program initiating unit 131 performs the access or check to the hardware resources 34 which are used by that process and to the other processes. When a certain error occurs, the process started by the program initiating unit 131 sends the notice of the error to the error-processing program 138.

The error-processing program 138 performs the error processing when the notice of the error is received. For example, the error-processing program 138 performs the error processing which is described later, when the notice of the error including the error classification as shown in FIG. 21 is received.

Figure 22:
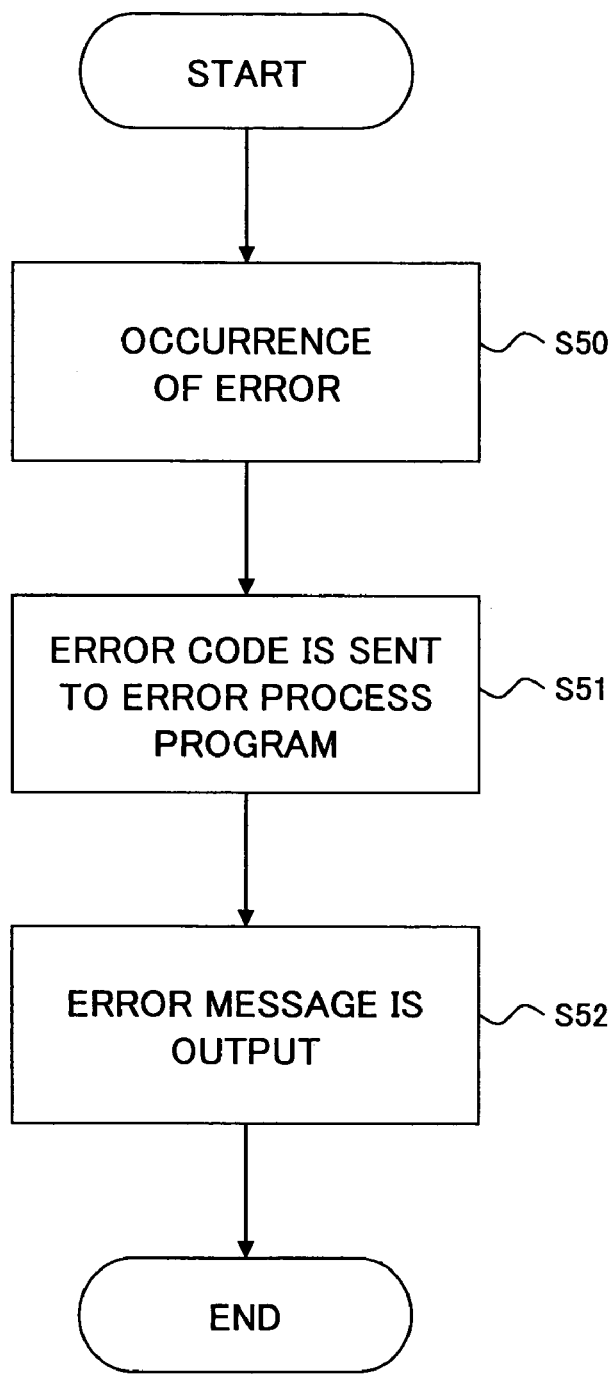
FIG. 22 is a flowchart for explaining an example of the error notification and error processing.

FIG. 21 shows an example of the error classification which is received by the error-processing program. FIG. 22 is a flowchart for explaining an example of the processing in which the notice of the error is sent and the error processing is performed.

At step S50, the process performs the access or the check to the hardware resources 34 used by that process and to the other processes, and detects whether a certain error takes place.

Progressing to step S51, the process notifies the error classification of the detected error to the error-processing program 138.

Progressing to step S52, the error-processing program 138 notifies the occurrence of the error to the operator by using the error notice unit which is previously set up as the user setting information. The error notice unit may include the displaying of the error screen to the control panel 120, the displaying of the function buttons indicating the usability of the multiple functions, the transmission of the error screen of the Web page indicating the occurrence of the error, the transmission of the e-mail for notifying the occurrence of the error, the printing of the error report for notifying the occurrence of the error, etc.

Figure 23:
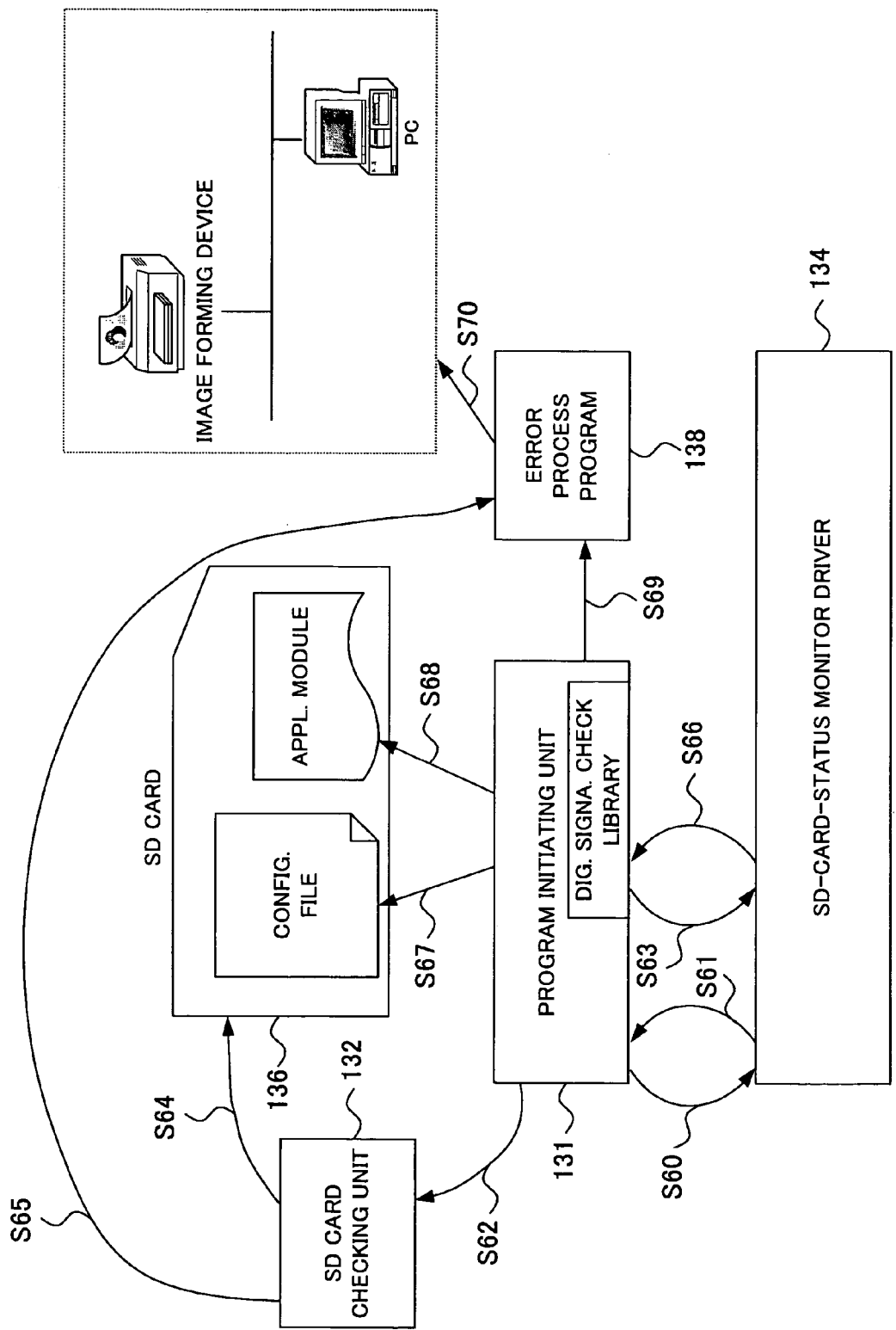
FIG. 23 is a diagram for explaining another example of the processing to initiate a program on the multi-function peripheral system by using a SD card.

FIG. 23 shows another example of the processing to initiate the program on the multi-function peripheral system by using the SD card. In FIG. 23, only the composition required for description among the composition of the multi-function peripheral system 31 is illustrated, and the composition which does not need description is omitted therein.

As shown in FIG. 23, at step S60, the program initiating unit 131 starts the process of the platform 36 and the application layer 35 of the multi-function peripheral system 31, and is set in the idle state, waiting for the occurrence of insertion or removal of the SD card 136.

When the SD card 136 is inserted in the SD card slot 110, progressing to step S61, the SD card status monitor driver 134 notifies the insertion of the SD card 136 to the program initiating unit 131.

When the insertion of the SD card 136 is notified from the SD card status monitor driver 134, the program initiating unit 131 progresses to step S62 and starts the SD card check unit 132.

Progressing to step S63, the program initiating unit 131 notifies to the SD card status monitor driver 134 that the end of the mounting of the SD card 136 is awaited.

Progressing to step S64, the SD card check unit 132 performs the compatibility check of the SD card 136 as an example of the operation check of the SD card 136.

When the result of the compatibility check is O.K., the SD card check unit 132 mounts the SD card 136. The SD card check unit 132 notifies to the SD card status monitor driver 134 that the result of the compatibility check of the SD card 136 is O.K. and the mounting of the SD card 136 is completed. After this, the processing is suspended.

On the other hand, when the result of the compatibility check is not O.K., the SD card check unit 132 progresses to step S65, and notifies to the error-processing program 138 that the result of the compatibility check of the SD card 136 is N.G. and the mounting of the SD card 136 is not performed.

When it is notified from the SD card check unit 132 that the result of the compatibility check of the SD card 136 is O.K. and the mounting of the SD card 136 is performed, the SD card status monitor driver 134 progresses to step S66 and notifies to the program initiating unit 131 that the SD card 136 is already mounted.

When it is notified from the SD card status monitor driver 134 that the SD card 136 is already mounted, the program initiating unit 131 progresses to step S67 and performs the application movement check to detect whether it is in the write protect state, and performs the authentication check of the configuration file using the authentication check library.

When the results of the application movement check and the authentication check of the configuration file are O.K., the program initiating unit 131 progresses to step S68 and performs the authentication check of the module for mounting.

When the results of the application movement check and the authentication check of the configuration file are N.G., the program initiating unit 131 progresses to step S69 and notifies to the error processing program 138 that the results of the application movement check and the authentication check of the configuration file are N.G.

Moreover, when the authentication check of the module for mounting is O.K, the program initiating unit 131 mounts the module for mounting and starts execution of the mounted module.

When the authentication check of the module for mounting is N.G., the program initiating unit 131 progresses to step S69 and notifies to the error-processing program 138 that the result of the authentication check of the module for mounting is N.G.

When it is notified from the program initiating unit 131 that the results of the application movement check and the authentication check of the configuration file are N.G. or that the result of the authentication check of the module for mounting is N.G., the error-processing program 138 progresses to step S70 and performs the error processing mentioned above.

The error-processing program 138 outputs the error report of FIG. 24, which indicates the error classification (for example, the compatibility check error, the authentication error, etc.) of the SD card 136, which is notified from the program initiating unit 131 or the SD card check unit 132, the file name with which the authentication errors takes place, the number of the SD card slot 110 where the error takes place, the device state, the return condition, and the contact information. FIG. 24 shows an example of the error report.

Figure 25:
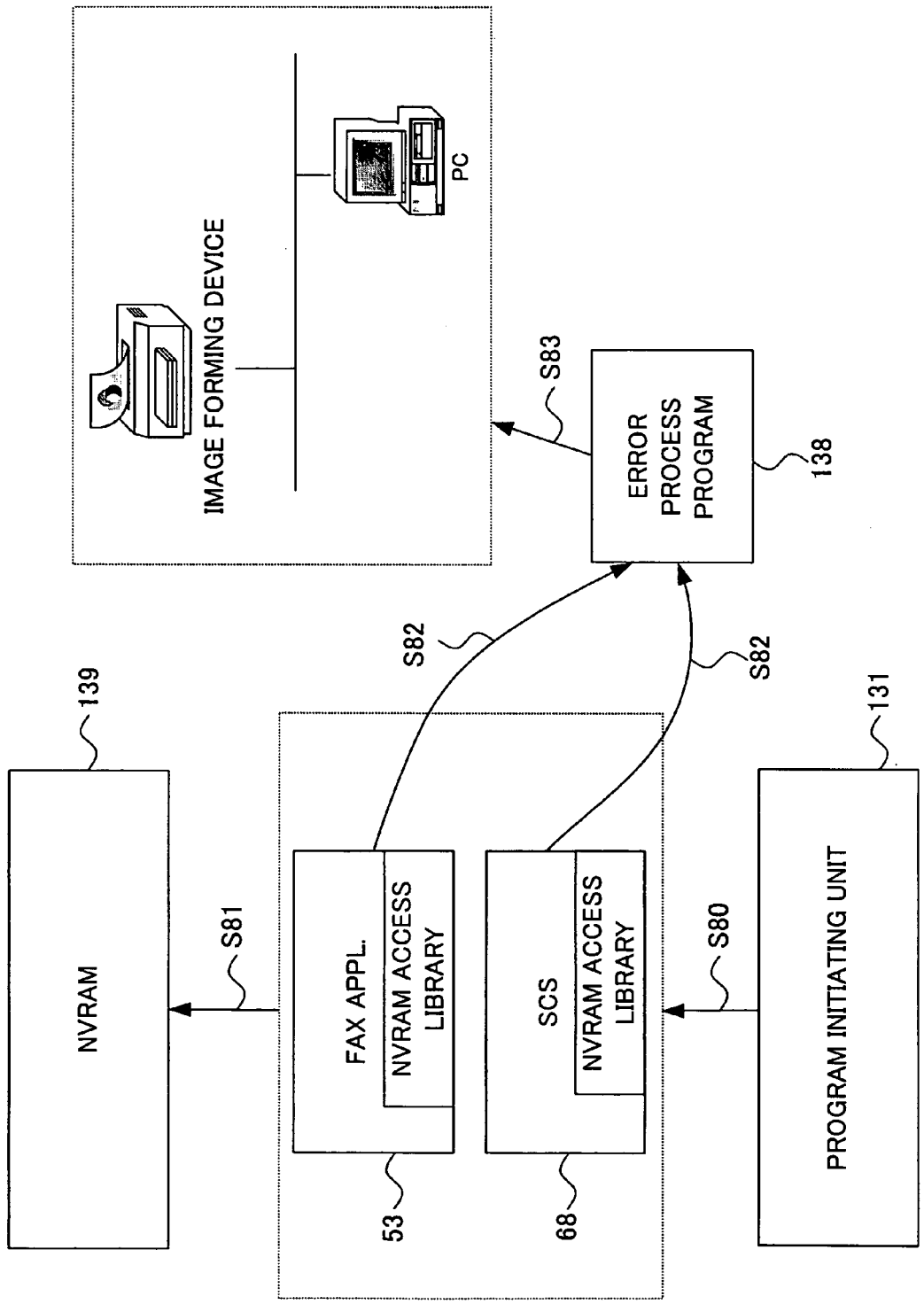
FIG. 25 is a diagram for explaining an example of the error processing concerning the hardware or software used by the program initiated by using the SD card.

FIG. 25 is a diagram for explaining an example of the error processing related to the hardware or software which is used by the program started by using the SD card.

As shown in FIG. 25, at step S80, the program initiating unit 131 starts the fax application 53 and the SCS 68 as an example of the process of the platform 36 and the application layer 35 of the multi-function peripheral system 31.

Progressing to step S81, the fax application 53 and the SCS 68 perform the access check to the NVRAM 139 as an example of the hardware resources 34 thereof by using the NVRAM access library.

When the result of the access check of the NVRAM 139 is O.K., the fax application 53 and the SCS 68 perform the reading and writing of data from and to the NVRAM 139.

On the other hand, when the result of the access check of the NVRAM 139 is N.G., the fax application 53 and the SCS 68 progress to step S82 and notify to the error-processing program 138 that the result of the access check of the NVRAM 139 is N.G.

When it is notified that the result of the access check is N.G., the error-processing program 138 progresses to step S83 and performs the error processing mentioned above.

The error-processing program 138 outputs the error report of FIG. 26, which indicates the error classification (for example, access error to NVRAM 139 etc.), received from the fax application 53 and the SCS 68, the error occurrence program, the device state, the contact information, etc. FIG. 26 shows an example of the error report.

Figure 27:
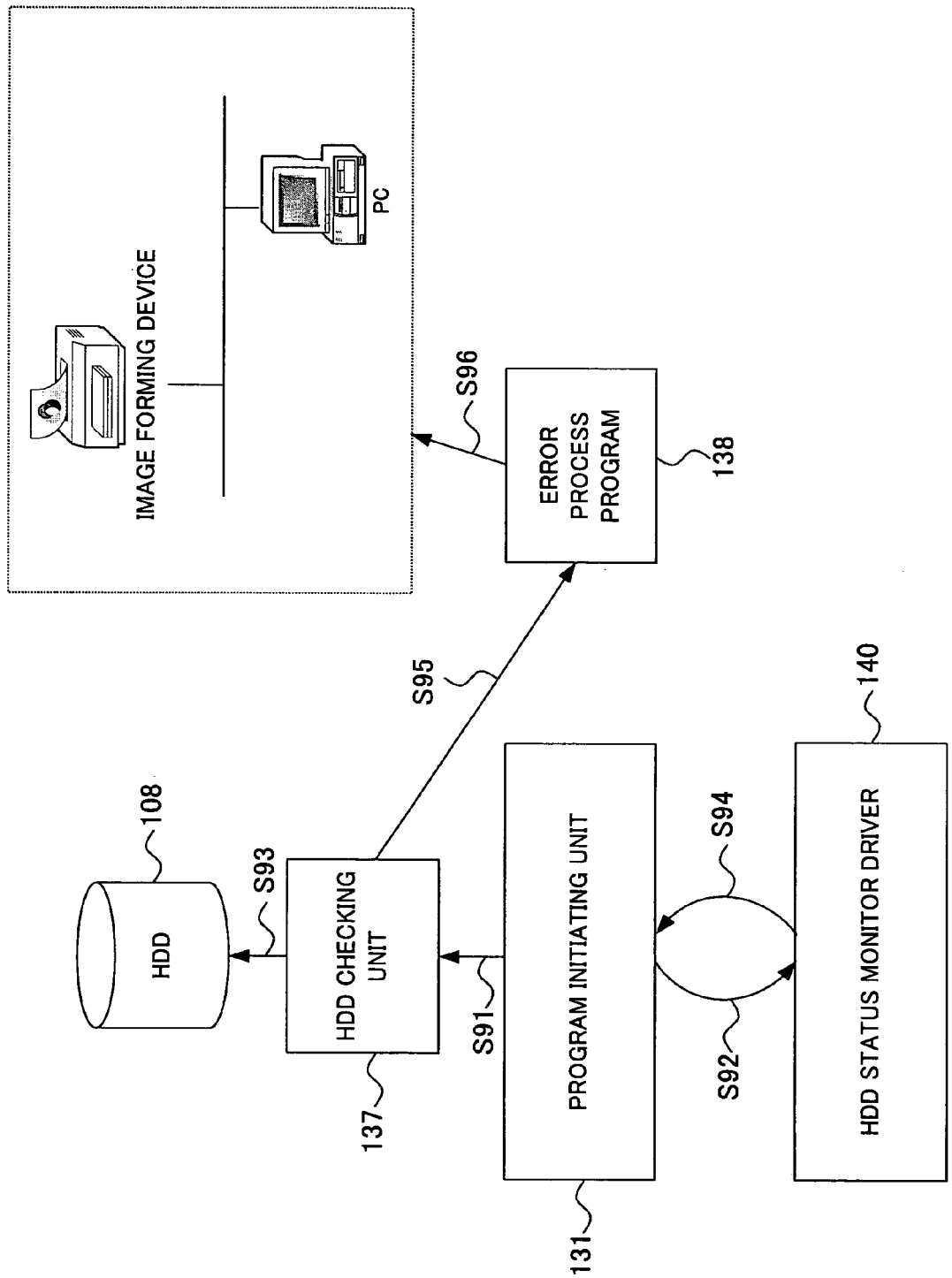
FIG. 27 is a diagram for explaining another example of the error processing concerning the hardware or software used by the program initiated by using the SD card.

FIG. 27 shows another example of the error processing related to the hardware or software which is used by the program started by using the SD card.

As shown in FIG. 27, at step S91, the program initiating unit 131 starts the HDD checking unit 137 as an example of the process of the platform 36 and the application layer 35 of the multi-function peripheral system 31.

Progressing to step S92, the program initiating unit 131 notifies to the HDD status monitor driver 140 that it is in the state of waiting for the mounting end of the HDD 108.

Progressing to step S93, the HDD checking unit 137 performs the operation check of the HDD 108.

When the result of the operation check is O.K., the HDD checking unit 137 mounts the HDD 108. The HDD checking unit 137 notifies to the HDD status monitor driver 140 that the result of the operation check of the HDD 108 is O.K. and the mounting of HDD 108 is performed. After this, the processing is suspended.

On the other hand, when the result of the operation check is not O.K., the HDD checking unit 137 progresses to step S95 and notifies to the error-processing program 138 that the result of the operation check of the HDD 108 is N.G. and the mounting of the HDD 108 is not performed.

When it is notified from the HDD checking unit 137 that the result of the operation check of the HDD 108 is O.K. and the mounting of the HDD 108 is already performed, the HDD status monitor driver 140 progresses to step S94 and notifies to the program initiating unit 131 that the mounting of the HDD 108 is completed.

When it is notified that the result of the operation check of the HDD 108 is N.G., the error-processing program 138 progresses to step S96 and performs the error processing mentioned above.

Figure 28:
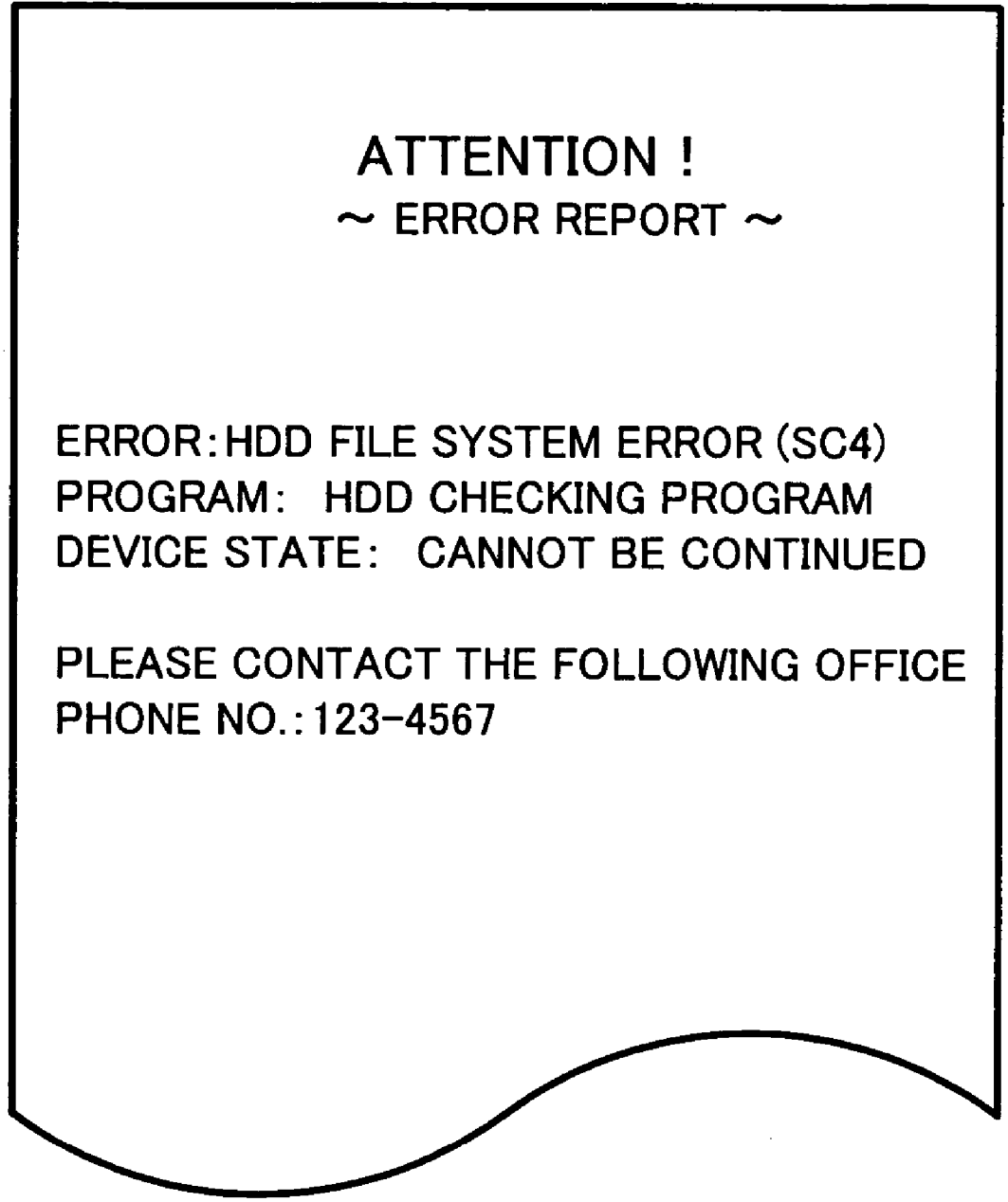
FIG. 28 is a diagram of an example of the error report in the error processing of FIG. 27.

The error-processing program 138 outputs the error report of FIG. 28, which indicates the error classification (for example, file system error, etc.) of the HDD 108, received from the HDD checking unit 137, the error occurrence program, the device state, the contact information, etc. FIG. 28 shows an example of the error report.

In the above-described embodiments, the description is focused on the processing of the multi-function peripheral system 31. However, the same discussion is easily applicable to the information processing apparatus 1 shown in FIG. 1 and FIG. 2. In the case of the information processing apparatus 1, the message output unit 13 may perform the processing which is the same as the processing performed by the SCS 68 or the error-processing program 138 of FIG. 6.

In addition, the operation check unit indicated in the claims is equivalent to the SD card check unit 132, the authentication check unit indicated in the claims is equivalent to the program initiating unit 131, and the error notification unit indicated in the claims is equivalent to the SCS 68.

The present invention is not limited to the above-described embodiments, and variations and modifications may be made without departing from the scope of the present invention.

The present application is based on Japanese priority application No. 2003-076603, filed on Mar. 19, 2003, and Japanese priority application No. 2004-060621, filed on Mar. 4, 2004, the entire contents of which are hereby incorporated by reference.

What is claimed is:

1. An information processing apparatus which has a detection unit to detect a recording medium and initiates a program read from the recording medium detected by the detection unit, the information processing apparatus comprising:
   an operation check unit performing an operation check of the recording medium detected by the detection unit;
   an authentication check unit performing an authentication check of the recording medium detected by the detection unit; and
   an error notification unit notifying an operator of an error of the recording medium if at least one of a result of the operation check and a result of the authentication check is an error.

2. An information processing apparatus according to claim 1 wherein the operation check unit is provided to inhibit the recording medium from being set in an accessible state if the result of the operation check is an error.

3. An information processing apparatus according to claim 1 wherein the authentication check unit is provided to inhibit reading of the program from the recording medium if the result of the authentication check is an error.

4. An information processing apparatus according to claim 1 wherein the authentication check unit is provided to read a file used for the authentication check, from the recording medium which is set in an accessible state for initiating the program, and to perform the authentication check of the recording medium using the file.

5. An information processing apparatus according to claim 4 wherein the authentication check unit performs the authentication check based on both an electronic signature, created from identification information and a configuration file of the recording medium, and an electronic signature, created from the program and model information of the apparatus.

6. An information processing apparatus according to claim 1 wherein the error notification unit is provided to display descriptions of the error on a display unit of the apparatus if at least one of the result of the operation check and the result of the authentication check is an error.

7. An information processing apparatus according to claim 6 wherein the error notification unit is provided to finish the displaying of the descriptions of the error in the display unit when the detection unit becomes impossible to detect the recording medium with which at least one of the result of the operation check and the result of the authentication check is an error.

8. An information processing apparatus according to claim 1 wherein the error notification unit is provided to display descriptions of the error on a display unit of a different information processing apparatus, which is connected to the information processing apparatus through a network, if at least one of the result of the operation check and the result of the authentication check is an error.

9. An information processing apparatus according to claim 1 wherein the error notification unit is provided to notify the operator of occurrence of the error by transmitting an e-mail, containing descriptions of the error, to the operator, if at least one of the result of the operation check and the result of the authentication check is the error.

10. An information processing apparatus according to claim 1 wherein the error notification unit is provided to cause a printing unit of the apparatus to print descriptions of the error if at least one of the result of the operation check and the result of the authentication check is the error.

11. An information processing apparatus according to claim 1 wherein the error notification unit is provided to notify an operator that a function of the program cannot be used, the program being not read from the recording medium with which at least one of the result of the operation check and the result of the authentication check is an error.

12. An information processing apparatus according to claim 1 wherein the operation check unit is provided to set the recording medium in an accessible state if the result of the operation check is normal, and the authentication check unit is provided to initiate the program read from the recording medium if the result of the authentication check is normal.

13. An information processing apparatus according to claim 12 wherein the program initiated by the authentication check unit performs at least one of an operation check and an authentication check of hardware or software used by the program, and the error notification unit is provided to notify the operator of an error of the hardware or software if at least one of results of the operation check and the authentication check of the hardware or software is an error.

14. An information processing apparatus according to claim 1 wherein the detection unit is provided to detect occurrence of insertion of the recoding medium to and removal of the recording medium from a recording medium slot of the apparatus.

15. An image forming apparatus which has a detection unit to detect a recording medium and initiates an image-formation-related program read from the recording medium detected by the detection unit, the image forming apparatus comprising:
   an operation check unit performing an operation check of the recording medium detected by the detection unit;
   an authentication check unit performing an authentication check of the recording medium detected by the detection unit; and
   an error notification unit notifying an operator of an error of the recording medium if at least one of a result of the operation check and a result of the authentication check is an error,
   wherein the image forming apparatus reads the program from the recording medium and initiates the read program if both the result of the operation check and the result of the authentication check are normal.

16. An image forming apparatus according to claim 15 wherein the error notification unit is provided to display descriptions of the error on an operation panel of the apparatus if at least one of the result of the operation check and the result of the authentication check is an error.

17. An image forming apparatus according to claim 16 wherein the error notification unit is provided to finish the displaying of the descriptions of the error in the operation panel when the detection unit becomes impossible to detect the recording medium with which at least one of the result of the operation check and the result of the authentication check is an error.

18. An image forming apparatus according to claim 15 wherein the error notification unit is provided to notify the operator of occurrence of the error by transmitting an e-mail, containing descriptions of the error, to the operator, if at least one of the result of the operation check and the result of the authentication check is the error.

19. An image forming apparatus according to claim 15 wherein the error notification unit is provided to cause a printing unit of the apparatus to print descriptions of the error if at least one of the result of the operation check and the result of the authentication check is an error.

20. An image forming apparatus according to claim 15 wherein the error notification unit is provided to control function buttons to notify the operator of usability of each of multiple functions of the apparatus in a visually distinguishable manner such that lighting of buttons of currently usable functions of the apparatus and lighting of buttons of currently unusable functions of the apparatus are distinguishable from each other.

21. An image forming apparatus according to claim 15 wherein the image forming apparatus further comprises hardware resources used in image formation, programs performing image-formation-related processing, and a platform provided between the hardware resources and the programs to manage the hardware resources which are shared by two or more of the programs.

22. An error processing method for use in an information processing apparatus which has a detection unit to detect a recording medium and initiates an image-formation-related program read from the recording medium detected by the detection unit, the error processing method comprising:
    performing an operation check of the recording medium detected by the detection unit;
    performing an authentication check of the recording medium detected by the detection unit; and
    notifying an operator of an error of the recording medium if at least one of a result of the operation check and a result of the authentication check is an error.

23. A computer-readable recording medium storing a program embodied therein for causing a computer to perform:
    detecting a recording medium;
    performing an operation check of the detected recording medium;
    performing an authentication check of the detected recording medium; and
    notifying an operator of an error of the detected recording medium if at least one of a result of the operation check and a result of the authentication check is an error.

* * * * *